United States Patent [19]

Utsunomiya et al.

[11] Patent Number: 5,539,158
[45] Date of Patent: Jul. 23, 1996

[54] LOAD CELL AND WEIGHING APPARATUS INCLUDING A STRAIN SENSOR WELDED TO A STRAIN INDUCING DEVICE

[75] Inventors: Michito Utsunomiya; Kazufumi Naito; Hiroyuki Konishi; Shotaro Tamai, all of Shiga, Japan

[73] Assignee: Ishida Co., Ltd., Kyoto, Japan

[21] Appl. No.: 341,032

[22] Filed: Nov. 15, 1994

Related U.S. Application Data

[63] Continuation of Ser. No. 996,644, Dec. 24, 1992, abandoned.

[30] Foreign Application Priority Data

Dec. 27, 1991 [JP] Japan ................................. 3-360357
Jun. 8, 1992 [JP] Japan ................................. 4-232841

[51] Int. Cl.⁶ ..................................................... G01G 3/14
[52] U.S. Cl. ........................................ 177/211; 73/862.632
[58] Field of Search ................................ 177/211, 210 R; 73/862.632, 862.637, 862.68

[56] References Cited

U.S. PATENT DOCUMENTS

| | | | |
|---|---|---|---|
| 3,745,502 | 7/1973 | Watanabe et al. | 338/3 |
| 3,805,604 | 4/1974 | Ormond | 73/862.638 X |
| 4,404,059 | 9/1983 | Livshits et al. | 156/629 |
| 4,475,610 | 10/1984 | Schwarzchild | 177/211 |
| 4,589,291 | 5/1986 | Sander | 73/862.65 |
| 4,657,097 | 4/1987 | Griffen | 177/211 |
| 4,785,673 | 11/1988 | Aumard | 73/862.65 |
| 5,220,971 | 6/1993 | Farr | 177/229 |
| 5,222,398 | 6/1993 | O'Brien | 73/862.632 |

FOREIGN PATENT DOCUMENTS

| | | |
|---|---|---|
| 0105564 | 4/1984 | European Pat. Off. . |
| 0227597 | 7/1987 | European Pat. Off. . |
| WO9208115 | 5/1992 | WIPO . |

OTHER PUBLICATIONS

Communication from European Patent Office (Germany), Jan. 30, 1995, translated to English.
HBM Leaflet, "Dehmungsmesstreifen mit Zubehor", Oct. 1986.
Extract Translation of "Dehmungsmesstreifen mit Zubehor", p. 29, first 2 paragraphs, Mar. 15, 1995.
Japanese Abstract Vo. 5 No. 134 (P-77) (806), Aug. 26, 1981 56-72323, dated Jun. 16, 1981.

Primary Examiner—Peter S. Wong
Assistant Examiner—Randy W. Gibson
Attorney, Agent, or Firm—Sughrue, Mion, Zinn, Macpeak & Seas

[57] ABSTRACT

A load cell for detecting a load imposed thereon and for improving the productivity thereof. The load cell includes a strain inducing device (1) made of metal and including a strain generating area (6) for generating a strain as a function of the load, and a strain sensor (40) including a metal substrate (41) having a strain detecting element (43) formed thereon for detecting the strain generated at the strain generating area (6) of the strain inducing means (1). The strain sensor (40) is mounted on the strain inducing device (1) with the metal substrate (41) welded thereto.

31 Claims, 13 Drawing Sheets

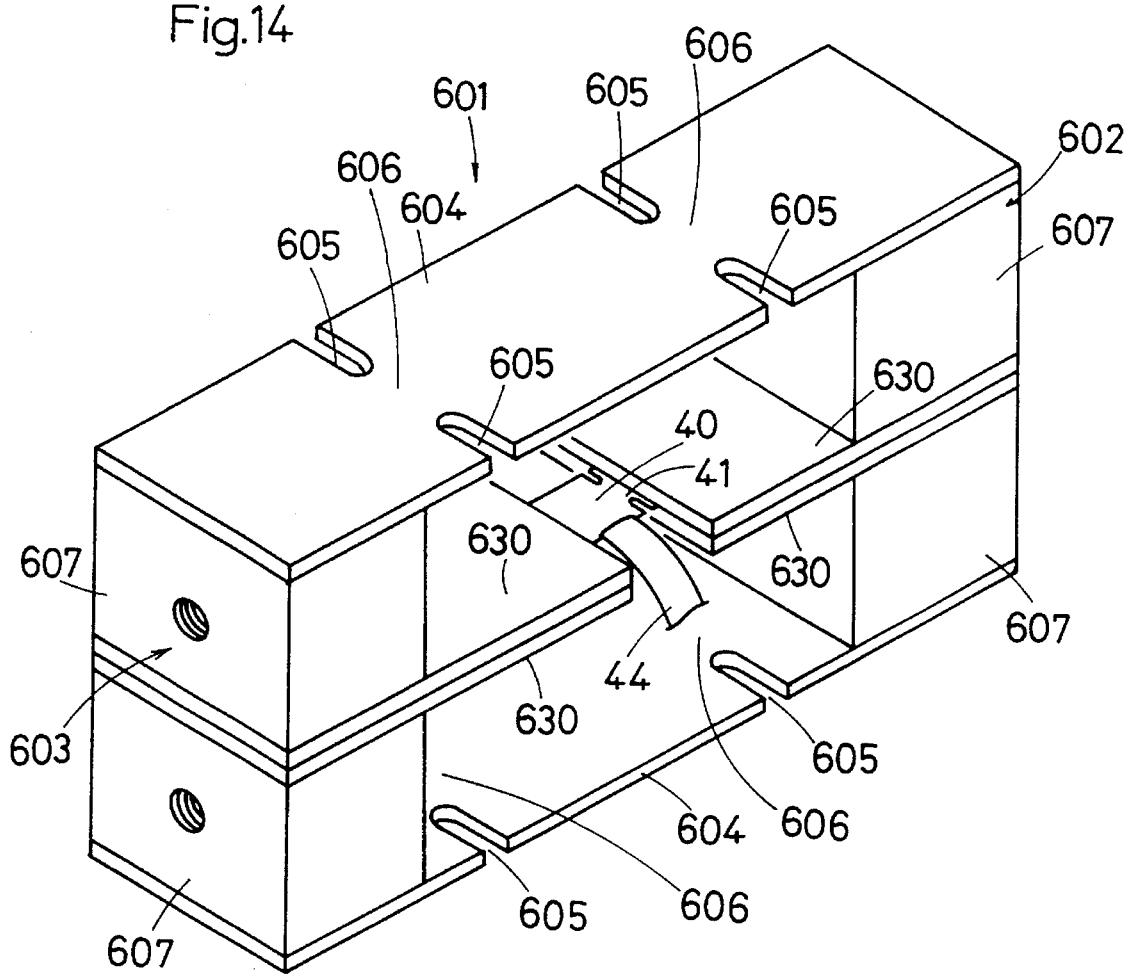

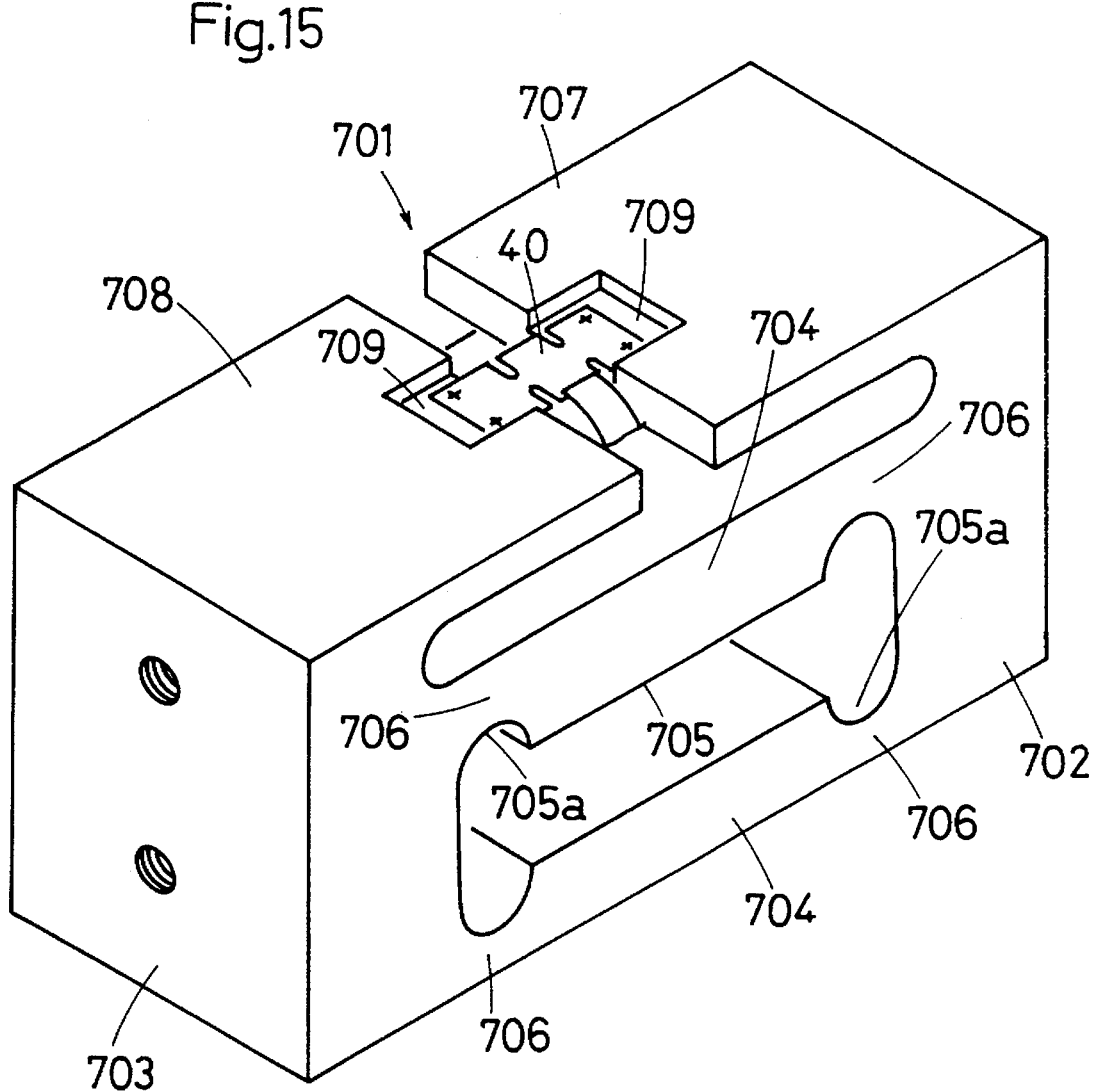

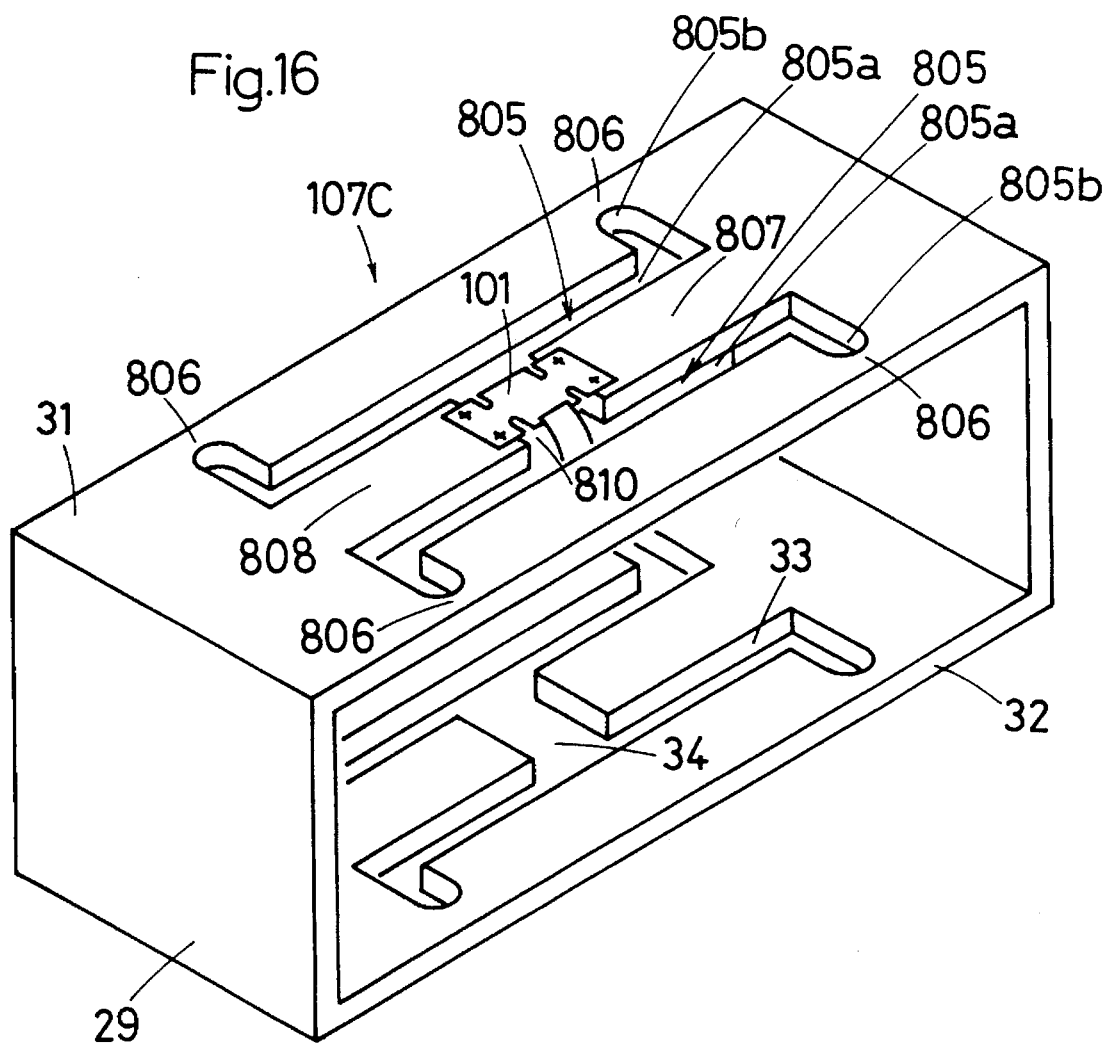

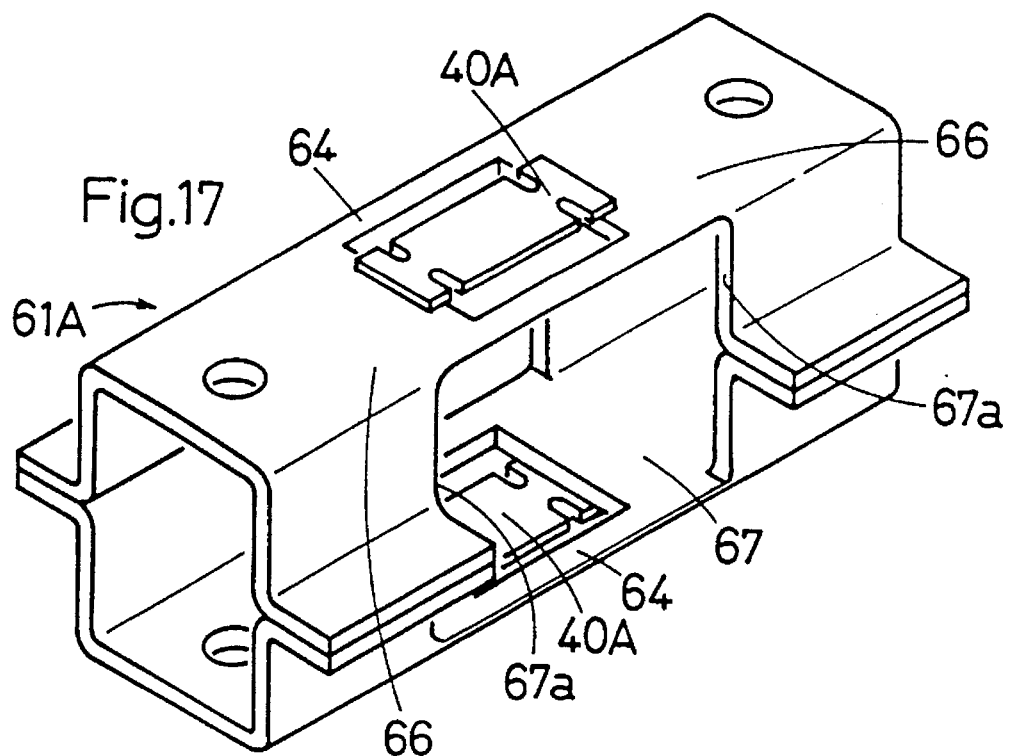
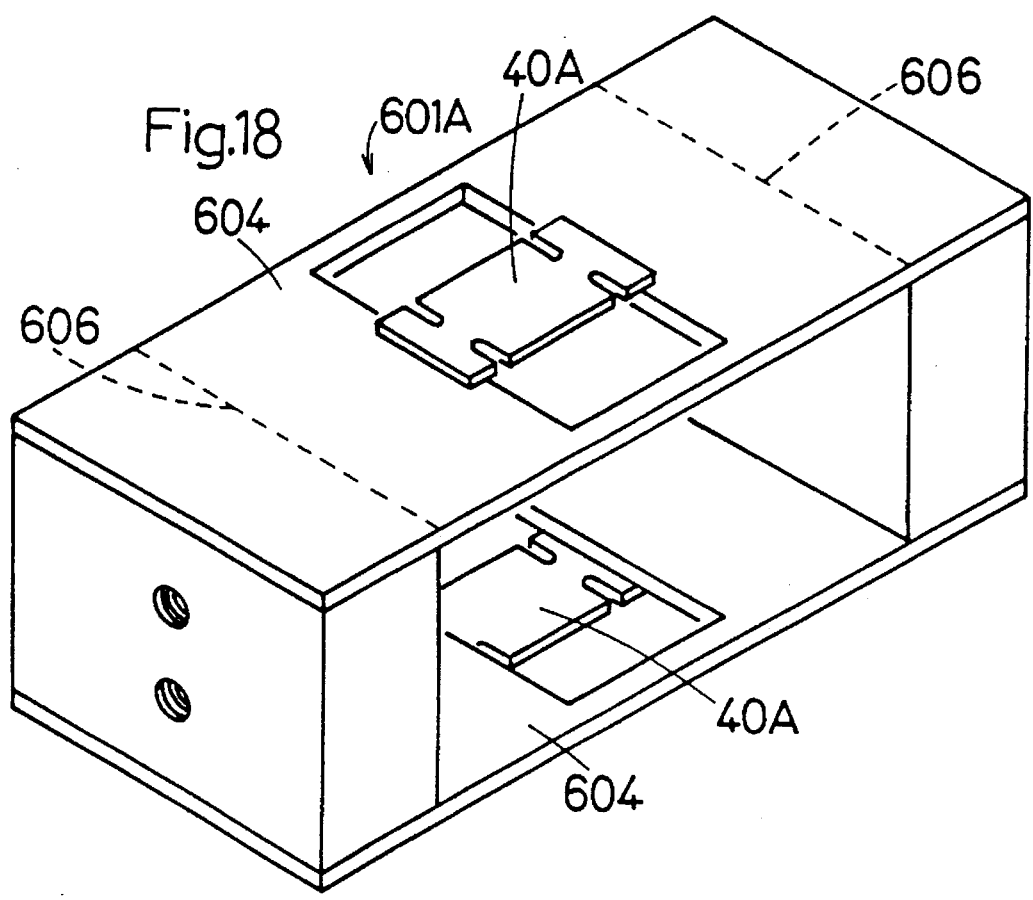

LOAD CELL AND WEIGHING APPARATUS INCLUDING A STRAIN SENSOR WELDED TO A STRAIN INDUCING DEVICE

This is a Continuation of application Ser. No. 07/996, 644, filed Dec. 24, 1992 now abandoned.

BACKGROUND OF THE INVENTION

1. Field of the Invention

The present invention relates generally to a load cell for use in a weighing apparatus such as an electronic scale and more particularly, to the load cell for electrically detecting a load imposed on a strain inducing element of a specific configuration, by the utilization of an electric characteristic of a strain detecting element such as, for example, a strain gauge, mounted on the strain inducing element.

2. Description of the Prior Art

The load cell used in an electronic scale generally is employed in the form of a strain inducing element as shown in FIG. 19 and comprises fixed and movable rigid bodies a1 and a2 opposite to each other and a pair of parallel beams b1 and b2 extending between the fixed and movable rigid bodies a1 and a2. All of those elements a1, a2, b1 and b2 are defined by forming a cavity c in a generally rectangular cubic metal block so that the fixed and movable rigid bodies a1 and a2 occupy respective opposite end portions of the metal block while the parallel beams b1 and b2 occupy respective opposite side portions of the metal block. The cave c is so shaped and so configured as to leave pairs of thin walled strain generating areas d1 and d2, d3 and d4, the strain generating areas d1 and d2 of one pair being defined at respective junctions of opposite ends of the beam b1 with the fixed and movable rigid bodies a1 and a2 while the strain generating areas d3 and d4 of the other pair are defined at respective junctions of opposite ends of the beam b2 with the fixed and movable rigid bodies a1 and a2.

The prior art strain inducing element A is so designed and so structured that, when a load W is applied to the movable rigid body a2, a considerable deformation occurs at the thin-walled strain generating areas d1 to d4 as shown by the phantom line, causing the movable rigid body a2 to undergo a parallel downward motion relative to the fixed rigid body a1. In other words, the strain generating areas d1 to d4 generate respective strains in a quantity proportional to the applied load W to reduce any possible adverse influence brought about by a bending moment. In practice, the fixed rigid body a1 of the strain inducing element A is rigidly secured to a base E of the electronic scale while the movable rigid body a2 is coupled with a scale table F. Strain detecting elements G such as, for example, strain gauges, are immovably placed on respective surfaces of the strain inducing element A in alignment with at least two of the strain generating areas d1 and d2 (or d3 and d4) so that a tensile strain and a compressive strain induced in the strain generating areas d1 and d2 as a function of the load placed on the scale table F can be detected by the respective strain detecting elements G thereby to provide an indication of the load W.

According to the prior art, the mounting of the strain detecting elements to the strain inducing element is carried out by bonding the strain detecting elements comprising a film base made of synthetic resin having a strain detecting resistance circuit formed thereon. Since the strain detecting elements is flexible and susceptible to damages, not only is a mechanical handling thereof difficult to achieve, but also a complicated and laborious job is required to mount the strain detecting elements to the strain inducing element. In addition, a substantial length of time is required up until the bonding agent used is cured or hardened, posing a problem associated with workability.

On the other hand, the Japanese Patent Publication No. 62-59767, published in 1987, discloses the formation of a patterned strain detecting circuit directly on the strain inducing element by the utilization of a thin-film technology and a photolithographic technique. The use of the thin-film technology in which a vapor deposition process is performed requires the strain inducing element to be loaded into a vacuum chamber and, therefore, the number of the strain inducing elements produced per unitary time is limited by the size of the vacuum chamber, posing a problem associated with the mass productivity.

SUMMARY OF THE INVENTION

Accordingly, a primary object of the present invention is to provide an improved load cell in which the strain detecting element can be efficiently mounted to the strain inducing element at a high workability and which can be manufactured at a high productivity.

It is a related object of the present invention to provide a method of manufacturing the Load cell of the type referred to above.

It is also an important object of the present invention to provide an improved weighing apparatus utilizing the load cell of the type referred to above.

It is a further important object of the present invention to provide a method of weighing a load by the use of the weighing apparatus of the type referred to above in which the load cell is coupled with a scale table.

The load cell according to one aspect of the present invention comprises a strain inducing means made of metal and including a strain generating region for generating a strain as a function of the load, and a strain sensor including a metal substrate having a strain detecting element formed thereon for detecting the strain generated at the strain generating region of the strain inducing means. The strain sensor is mounted in the strain inducing means with said metal substrate welded thereto.

A method of manufacturing the load cell according to the present invention comprises formation of a strain detecting element on a metallic substrate thereby to provide the strain sensor, and mounting of the strain sensor in the strain inducing element with the metal substrate welded to said strain inducing element.

According to the above described aspects of the present invention, since the strain sensor is secured to the strain inducing means by the utilization of a welding technique, a mechanical handling is easy to accomplish and no large-sized workshop such as an vacuum chamber is required. Accordingly, as compared with the prior art structure in which either a bonding agent or a patterning technique is employed, the mounting of the strain sensor to the strain inducing means can readily and efficiently be accomplished with high workability, thereby facilitating a production of the load cells.

According to a preferred embodiment of the present invention, the strain inducing means comprises a fixed rigid body adapted to be secured to a base, a movable rigid body adapted to receive the load, and a pair of beam members extending parallel to each other and connecting the fixed and movable rigid bodies together. The fixed and movable rigid bodies occupy respective positions corresponding to opposite end portions of the load cell. This strain inducing means is so designed and so structured that, when the load acts on the movable rigid body, the movable rigid body undergoes a parallel downward motion relative to the fixed rigid body, and wherein the strain generating region is defined on each of the beam members. This structure represents the Roberval's parallel motion mechanism in which the strain induced in the strain generating area is in proportion to the applied load and is little adversely affected by the moment of the load.

According to another preferred embodiment of the present invention, the strain inducing means comprises generally elongated first and second structures of substantially identical construction with the first structure positioned above the second structure so as to define a generally hollow therebetween, an intermediate plate means sandwiched between the first and second structures and spaced a distance from each other, said strain sensor being positioned within the hollow and welded to the intermediate plate means. The first structure is of one-piece construction including a pair of upper rigid body forming regions opposite to each other and connected together by means of an upper beam, said upper rigid body forming regions constituting respective upper portions of the fixed and movable rigid bodies. The second structure is also of one-piece construction including a pair of lower rigid body forming regions and opposite to each other and connected together by means of a lower beam, said lower rigid body forming regions constituting respective lower portions of the fixed and movable rigid bodies..

Preferably, the strain inducing means is made of a metal plate, and is of a symmetrical structure, more specifically, symmetric with respect to a center point thereof.

According to the second mentioned preferred embodiment of the present invention, the strain inducing means represents a three-layered structure in which the intermediate plate means intervenes between the first and second structures. Therefore, unlike the prior art strain inducing element which is manufactured by the use of a die casting technique and a machining process using metallic material, the strain inducing means used in the practice of the present invention can be manufactured by the use of a metal blanking technique or any suitable press work, making it possible to enhance the productivity of the strain inducing means.

According to a further preferred embodiment of the present invention, the intermediate plate means used in the three-layered structure is constituted by first and second intermediate plates separate from each other. The first intermediate plate is sandwiched between respective first portions of the first and second structures corresponding in position to the fixed rigid body while the second intermediate plate is sandwiched between respective second portions of the first and second structures corresponding in position to the movable rigid body. The first and second intermediate plates have respective side edge portions confronting with each other so as to define mounts on which said strain sensor is disposed with opposite ends thereof welded respectively to said side edge portions. Alternatively, the intermediate plate means may be constituted by a single plate member having an opening defined at an intermediate portion thereof and, in this case, opposite peripheral lip regions of said opening define respective mount to which the opposite ends of the strain sensor are wended while traversing across the opening.

According to this further preferred embodiment of the present invention, only the opposite ends of the strain sensor which are wended to the intermediate plate means through the respective mounts contact the strain inducing means, and the remaining portion of the strain sensor itself does not contact any portion of the strain inducing means. Accordingly, there is no possibility that the strain sensor has its relatively large surface which may undergo a frictional contact with the strain inducing means to an extent as to restrict the deformation of the strain inducing means in correspondence with the applied load.

According to a still further preferred embodiment of the present invention, the strain inducing means and the metal substrate forming a part of the strain sensor are made of identical metallic material. This is particularly advantageous in that, since the metal substrate carrying the strain detecting element and the strain inducing means have an equal coefficient of thermal expansion and, therefore, a favorable temperature-dependent characteristic of the strain detection can be appreciated.

Preferably, the metal substrate is in the form of a thin plate having a strain generating area defined therein for facilitating stress build-up and wherein said strain sensor is positioned at the strain generating area. By so doing, the amount of strain produced in the strain sensor can be increased enough to improve the accuracy of detection of the load.

Preferably, the metal substrate has a cross-sectional surface area small enough to prevent the amount of strain induced in the strain inducing means from being varied.

Preferably, an electrically insulating layer is formed on one surface of the metal substrate and the strain detecting element is formed on the insulating layer.

Again preferably, the metal substrate has a pair of opposite portions clear from a region where the strain sensor is formed, so that the metal substrate can be supported by the intermediate plate means with said opposite portions thereof welded thereto. This feature is effective to avoid any possible deformation or damage of the strain detecting element under the influence of heat evolved during the welding.

The welding employed in the practice of the present invention to connect the strain sensor to the strain inducing means is preferably a spot welding. As compared with a seam welding, the surface area of the resultant weld deposit, that is, the surface area of contact between the metal substrate and the strain inducing means in the spot welding, is so small enough to avoid any possible restriction on the deformation of the strain inducing means in correspondence with the applied load which would occur if a tight frictional contact occurs between the metal substrate and the strain inducing means as a result of a relative displacement between the metal substrate and the strain inducing means.

Also, since a generation of internal stresses in the metal substrate as a result of the spot welding is suppressed, there is less possibility that a deformation of the metal substrate in correspondence with the applied load is adversely affected by the internal stress.

Of various welding methods, the YAG welding method is particularly advantageous in that no weld strain is left at the weld deposits.

According to a still further aspect of the present invention, there is provided a weighing apparatus utilizing a load cell and having a scale table. The load cell is operably coupled with said scale table to detect a load placed on the scale table. This load cell comprises a strain inducing means made of metal and including a strain generating region for generating a strain as a function of the load and a strain sensor including a metal substrate having a strain detecting element formed thereon for detecting the strain generated at the strain generating region of the strain inducing means, said strain sensor being mounted in the strain inducing means with said metal substrate welded thereto. The load cell may, if desired, be employed in a plural number in a fashion operatively coupled with the single scale table.

According to a yet further aspect of the present invention, there is provided a method of weighing an object to be weighed, which is placed on a scale table of a weighing apparatus which is operatively coupled with a load cell, said load cell comprising a strain inducing means made of metal and including a strain generating region for generating a strain as a function of the load and a strain sensor including a metal substrate having a strain detecting element formed thereon for detecting the strain generated at the strain generating region of the strain inducing means, said strain sensor being mounted in the strain inducing means with said metal substrate welded thereto. This method comprises detection of the strain induced in the strain inducing means. Even in the practice of the weighing method according to the present invention, the metal substrate has a cross-sectional surface area small enough to prevent the amount of strain induced in the strain inducing means from being varied.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

FIGS. 13 to 18 are schematic perspective views of the load cell according to fourth, fifth, sixth, seventh, eighth and ninth preferred embodiments of the present invention, respectively.

DETAILED DESCRIPTION OF THE EMBODIMENTS

Figure 1:
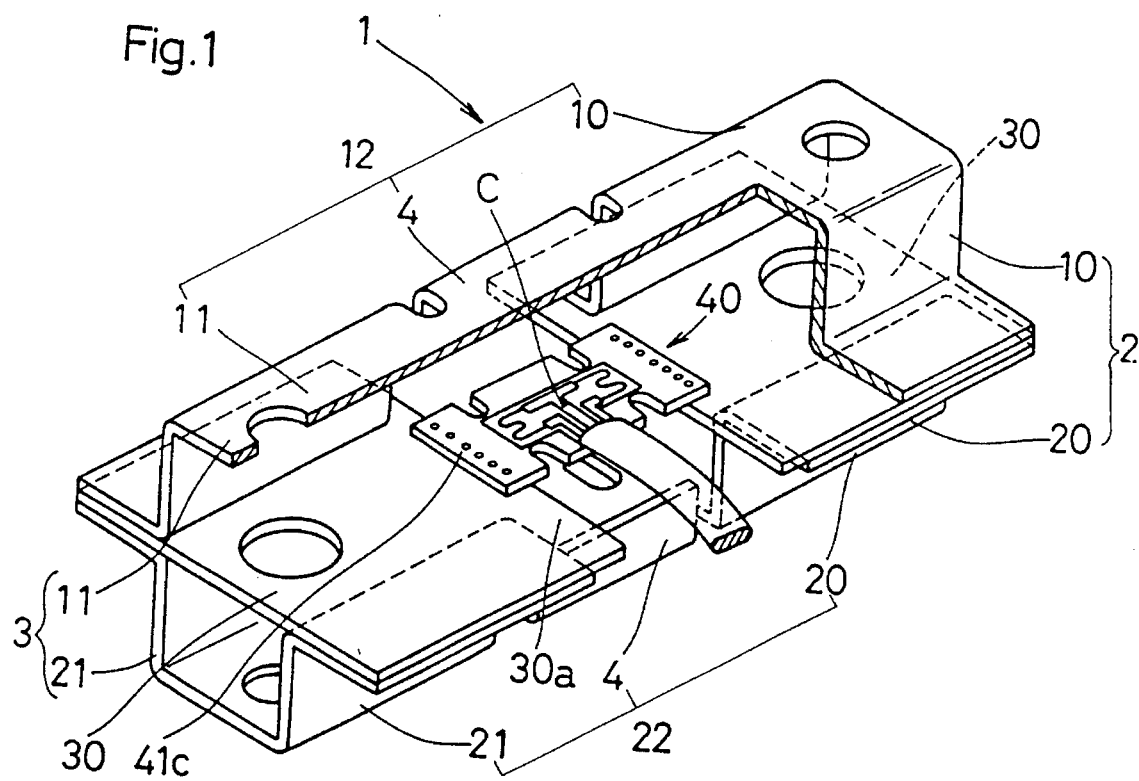
FIG. 1 is a schematic perspective view, with a portion cut away, showing a load cell according to a first preferred embodiment of the present invention.

Referring first to FIG. 1, a strain inducing unit 1 used in a load cell according to the present invention has fixed and movable rigid bodies 2 and 3 occupying respective opposite ends of the strain inducing unit 1. This strain inducing unit 1 comprises generally elongated upper (first) and lower (second) plate structures 12 and 22 of substantially identical construction with the upper plate structure 12 positioned above the lower plate structure 22 so as to define a generally rectangular-sectioned hollow therebetween, generally square first and second intermediate plate members 30A and 30B sandwiched between the upper and lower plate structures 12 and 22 and spaced a distance from each other, and a strain sensor 40 positioned within the rectangular-sectioned hollow and supported between the first and second intermediate plate members 30A and 30B so as to bridge therebetween.

The upper plate structure 12 is of a one-piece construction including a pair of rigid body forming regions 10 and 11 opposite to each other and connected together by means of an upper beam 4, said rigid body forming areas 10 and 11 constituting respective upper portions of the fixed and movable rigid bodies 2 and 3. Similarly, the lower plate structure 22 is of one-piece construction including a pair of rigid body forming regions 20 and 21 opposite to each other and connected together by means of a lower beam 4, said rigid body forming regions 20 and 21 constituting respective lower portions of the fixed and movable rigid bodies 2 and 3, respectively. It is to be noted that the strain inducing unit 1 having the rectangular-sectioned hollow defined between the upper and lower plate structures 12 and 22 is symmetric in shape, or more specifically, symmetric with respect to a center point C thereof. Thus, the strain inducing unit 1 represents a three-layered structure in which the intermediate plate members 30A and 30B intervene between the upper and lower structures 12 and 22.

Figure 2:
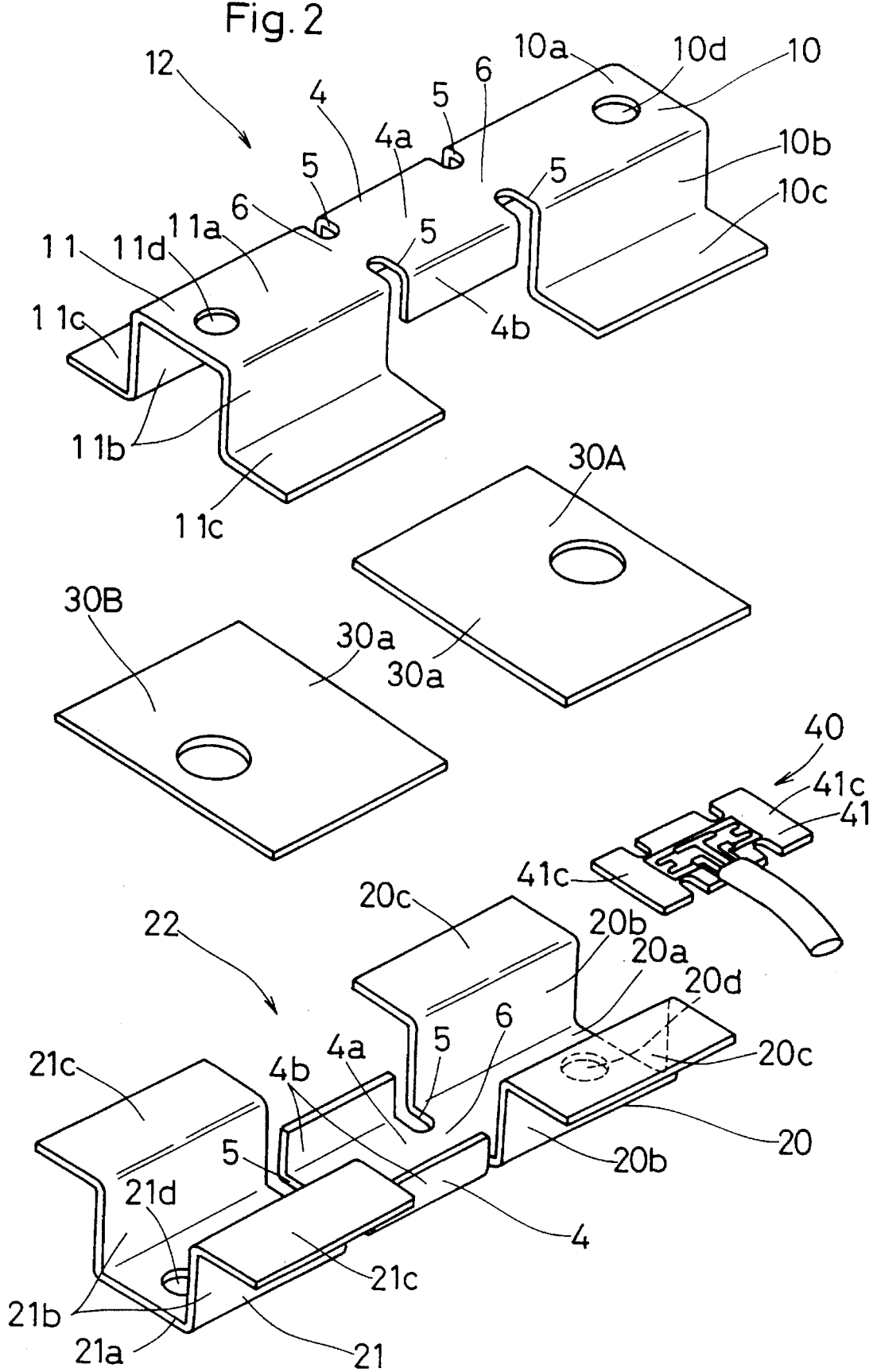
FIG. 2 is an exploded view of the load cell shown in FIG. 1.

The details of various component parts of the strain inducing unit 1 according to the present invention will now be described with particular reference to FIG. 2 showing an exploded view of the strain inducing unit 1.

The upper plate structure 12 has its opposite end portions constituting the respective rigid body forming regions 10 and 11. Each of the opposite end portions, that is, the rigid body forming regions 10 and 11, of the upper plate structure 12 is constituted by a top wall 10a or 11a, a pair of opposite side walls 10b or 11b substantially perpendicular to the top wall 10a or 11a, and a pair of flanges 10c or 11c protruding laterally outwardly from the associated side walls 10b or 11b and lying in a plane parallel to the top wall 10a or 11a. The top walls 10a and 11a of the respective rigid body forming regions 10 and 11 are connected together by means of the upper beam 4 which is constituted by a top wall 4a flush with any one of the top walls 10a and 11b and a pair of opposite side walls 4b normal to the top wall 4a. This upper plate structure 12 has two pairs of notches, generally identified by 5, each pair positioned on one side thereof with respect to the longitudinal axis of the upper plate structure 12 so as to define two constricted regions 6 of reduced width between the top walls 10a and 4a and between the top walls 11a and 4a.

It is to be noted that the upper plate structure 12 of the above described construction is symmetric in shape with respect to a vertical plane including the longitudinal axis thereof and also with respect to a vertical plane including an axis extending perpendicular to the longitudinal axis thereof and across a point intermediate the length of the upper plate structure 12 and that each of the constricted regions 6 has a reduced rigidity as compared with the remaining portion of the upper plate structure 12 and does therefore define a strain inducing area where stresses are easy to build up. It is also to be noted that each of the respective top walls 10a and 11a of the rigid body forming regions 10 and 11 has a bolt hole 10d and 11d defined therein for the passage therethrough of a respective fitting bolt (not shown).

Similarly, the lower plate structure 22 has its opposite end portions constituting the respective rigid body forming regions 20 and 21. Each of the opposite end portions, that is, the rigid body forming regions 20 and 21, of the lower plate structure 22 is constituted by a bottom wall 20a or 21a, a pair of opposite side walls 20b or 21b substantially perpendicular to the bottom wall 20a or 21a, and a pair of flanges 20c or 21c protruding laterally outwardly from the associated side walls 20b or 21b and lying in a plane parallel to the bottom wall 20a or 21a. The bottom walls 20a and 21a of the respective rigid body forming regions 20 and 21 are connected together by means of the lower beam 4 which is constituted by a bottom wall 4a flush with any one of the bottom walls 20a and 21b and a pair of opposite side walls 4b normal to the bottom wall 4a. This lower plate structure 22 has two pairs of notches, generally identified by 5, each pair positioned on one side thereof with respect to the longitudinal axis of the lower plate structure 22 so as to define two constricted regions 6 of reduced width between the bottom walls 20a and 4a and between the bottom walls 21a and 4a.

It is to be noted that the lower plate structure 22 of the above described construction is symmetric in the same manner as the upper plate structure 12, and that each of the constricted regions 6 has a reduced rigidity as compared with the remaining portion of the lower plate structure 22 and does therefore define a strain inducing area where stresses are easy to build up. It is also to be noted that each of the respective bottom walls 20a and 21a of the rigid body forming regions 20 and 21 has a bolt hole 20d and 21d defined therein for the passage therethrough of a respective set bolt (not shown).

Each of the first and second intermediate plate members 30A and 30B is in the form of a generally square thin plate and has one side edge portion 30a defining a mount for the fitting of the strain sensor 40. To complete the strain inducing unit 1, the first and second intermediate plate members 30A and 30B are sandwiched between the upper and lower plate structures 12 and 22 with the flanges 10c and 11c of the upper plate structure 12 welded together with the associated flanges 20c and 21c of the lower plate structure 22. At this time, opposite side edge portions of each of the first and second intermediate plate members 30A and 30B on respective side of the mount 30a are sandwiched between the flanges 10c and 11c of the upper plate structure 12 and the flanges 20c and 21c of the lower plate structure 12 and welded thereto. For welding the upper and lower plate structures 12 and 22 together with the first and second intermediate plate members 30A and 30B intervening therebetween, any suitable welding method may be employed such as, for example, a spot welding technique. It is to be noted that prior to the welding being effected to the flanges 10c, 11c and 20c, 21c of the upper and lower plate structures 12 and 22, the strain sensor 40 is secured at its opposite ends to the respective mounts 30a of the first and second intermediate plate members 30A and 30B so as to bridge between the first and second intermediate plate members 30A and 30B.

The strain inducing unit 1 of the construction described above is so designed and so structured as to constitute a Roberval's parallel motion mechanism as is the case with that shown in 19. In other words, the strain inducing unit 1 is so designed and so structured that, when a lead is imposed on the movable rigid body 3, the strain inducing unit 1 undergoes a considerable bending about the four constructed or strain inducing areas 6 in the upper and lower plate structures 12 and 22 while the movable rigid body 3 moving downwardly and generally parallel relative to the fixed rigid body 2.

Figure 3:
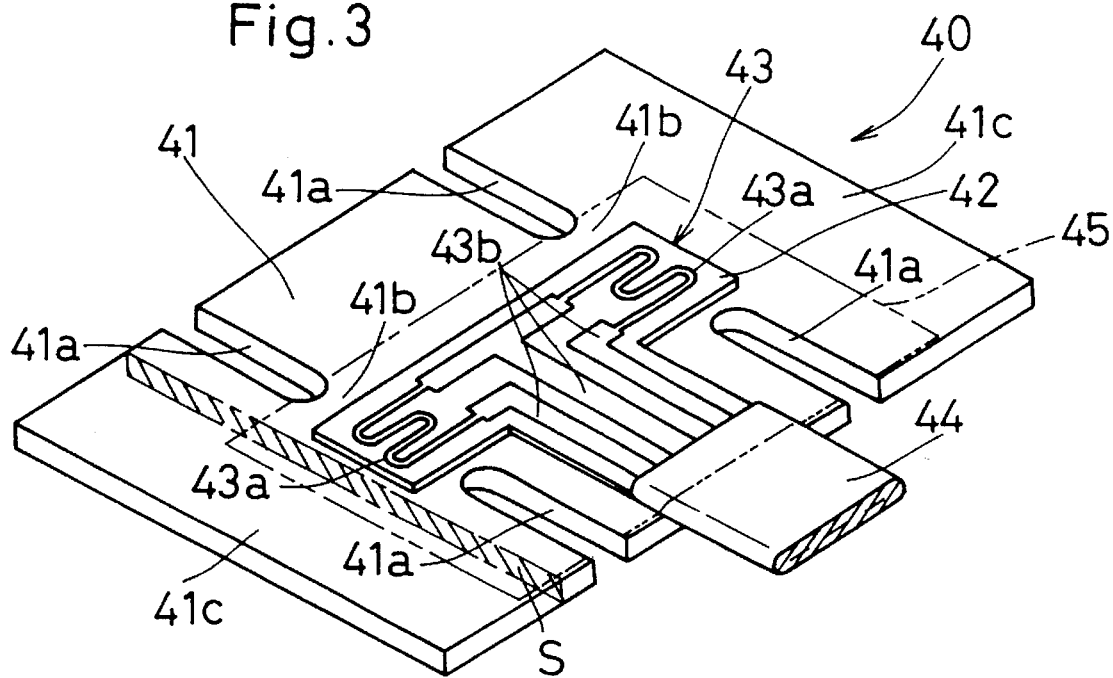
FIG. 3 is a schematic perspective view of a strain sensor used in the load cell of the present invention.

Referring now to FIG. 3 for the detailed discussion of the strain sensor 40, the strain sensor 40 comprises a metal substrate 41 in the form of a generally rectangular thin metal plate having its opposite side edge portions formed with respective pairs of notches generally identified by 41a. The notches 41a of each pair are aligned with each other so as to leave between the notches 41a of the respective pair an associated constricted area 41b which serve as a strain generating area where stresses are easy to build up. This strain sensor 40 also comprises a strain detecting unit 43 mounted on the metal substrate 41 through an electric insulator layer 42 so as to extend generally between the constricted or stress generating areas 41a. The strain detecting unit 43 is formed by depositing electroconductive metal foil in a predetermined pattern on the electric insulator layer 42 by the use of, for example, a circuit printing technique or a lithographic technique and includes a pair of strain detecting resistance elements 43a and electric conductors 43b which connect the strain detecting resistance elements 43a with a flat cable or a flexible ribbon cable 44 having a corresponding number of electric lines connected, or otherwise soldered, with the conductors 43b.

The strain detecting unit 43 is so designed that, when a strain acts on the strain detecting unit 43, electric signals each indicative of a change in resistance of the associated strain detecting resistance elements 43a can be outputted through the flat cable 44. Preferably, the strain detecting unit 43 on the electric insulator layer 42 is protected by a protective overcoat 45 of any suitable electrically insulating material.

So far described, when a load is applied to a scale table as will be described, the movable rigid body 3 is displaced downwardly relative to the fixed rigid body 2, accompanied by a corresponding downward displacement of the mount 30a of the second intermediate plate member 30A in the movable rigid body 3 relative to the mount 30a of the first intermediate plate member 30B in the fixed rigid body 2. When this downward displacement of the movable rigid body 3 relative to the fixed rigid body 2 takes place, the strain sensor 40 is deformed in a manner generally depicting the shape of a figure "S" with the consequence that a tension acts on the constricted or strain generating area 41b (FIG. 3) of the metal substrate 41 adjacent the fixed rigid body 2 whereas a compression acts on the strain generating area 41b of the metal substrate 41 adjacent the movable rigid body 3. This deformation of the strain sensor 40 results in respective changes in resistance of the electric resistance elements 43a which are subsequently outputted through a Wheatstone bridge network shown in FIG. 4.

Figure 4:
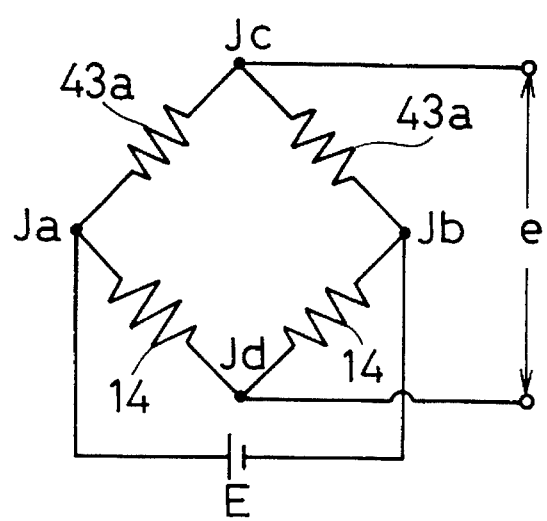
FIG. 4 is a circuit diagram showing a load detecting circuit in which the load sensor is employed.

More specifically, with reference to FIG. 4, the electric resistance elements 43a are connected in series with each other through a junction Jc to form a series circuit which is in turn connected with a series circuit of dummy resistors 14 connected with each other through a junction Jd, thereby to form the Wheatstone bridge network. In this Wheatstone bridge network shown in FIG. 4, a predetermined voltage E is applied between a junction Ja of one of the strain detecting resistance elements 43a with one of the dummy resistors 14 and a junction Jb of the other of the strain detecting resistance elements 43a with the other of the dummy resistors 14, an output voltage e, that is, an electric output signal as a function of the load imposed thereon, can be generated between the junctions Jc and Jd in correspondence with a change in resistance of each of the strain detecting resistance elements 43a. This electric output signal is eventually processed to provide a measurement of the load imposed on the strain inducing unit 1 of the present invention.

The strain sensor 40 shown in FIG. 3 is supported within the rectangular-sectioned hollow by the first and second intermediate plate members 30A and 30B, shown in FIG. 2, with opposite end portions 41c of the metal substrate 41 mounted on and spot-wended to the respective mounts 30a by the use of any suitable welding technique such as, for example a YAG welding technique or an electron beam welding technique.

Figure 5:
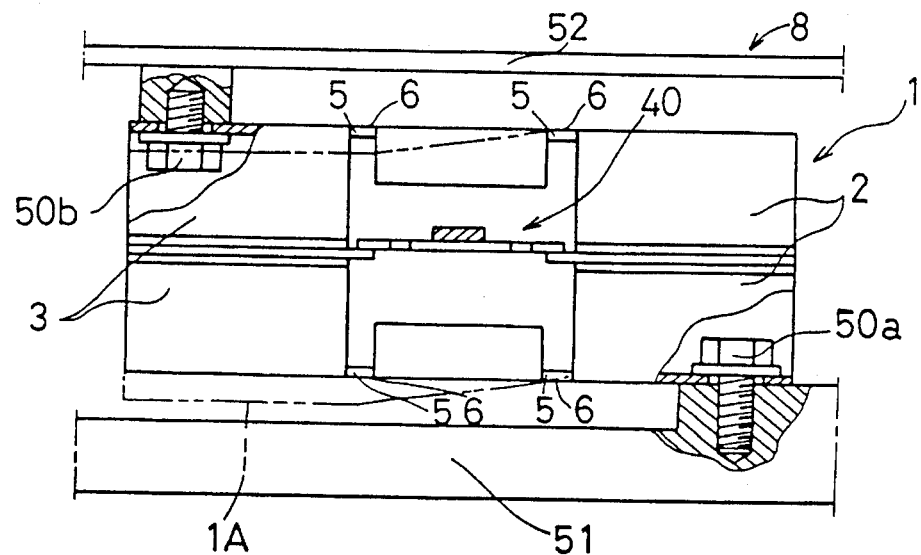
FIG. 5 is a schematic side sectional view showing the load cell employed in a weighing apparatus.

Referring now to FIG. 5, the strain inducing unit 1 in an assembled condition is mounted on a base plate 51, forming a part of an electronic scale, by means of a set bolt 50a passing through the fixed rigid body 2 and fastened to the base plate 51 from above. On the other hand, the strain detecting unit 1 is secured to a scale table 52, also forming another part of the electronic scale, by means of a set bolt 50b passing through the movable rigid body 3 and fastened to the scale table 52 from below. Thus, it will readily be understood that, when an object to be weighed is placed on the scale table 52, the movable rigid body 3 moves downwardly and generally parallel relative to the fixed rigid body 2 as shown by the phantom line 1A, accompanied by a generation of a substantial amount of strain which is detected by the strain sensor 40. In this way, the load imposed on the movable rigid body 3, that is, the weight of the object to be weighed that is placed on the scale table 52, is measured by processing the electric output signal generated from the strain sensor 40.

Preferably, to manufacture the strain sensor 40, a method may be employed which comprises the steps of forming a plurality of strain detecting units 43 on a single metal matrix and then cutting the metal matrix to produce the individual strain detector assemblies 40 each including the metal substrate 41 with the strain detecting unit 43 formed thereon. This method permits the manufacture of a plurality of the strain sensor 40 using a single metal matrix and is therefore advantageous in terms of productivity.

The strain inducing unit 1 including the upper and lower plate structures 12 and 22 and the first and second intermediate plate members 30A and 30B is preferably made of stainless steel, but may be made of any other suitable metal such as, for example, aluminum. Similarly, the metal substrate 41 forming a part of the strain sensor 40 is preferably made of the same metal as that used for the strain inducing unit 1, that is, stainless steel, but may be made of any other suitable metal such as, for example, aluminum.

The electric insulator layer 42 forming another part of the strain sensor 40 may be made of any suitable synthetic resin having an electrically insulating property such as, for example, polyimide resin, polyester resin, phenol resin, or epoxy resin.

The strain detecting resistance elements 43a also forming another part of the strain sensor 40 is made of metal such as, for example, a copper-nickel alloy or a nickel-chromium alloy while the conductors 43b are made of metal having a high electroconductive property such as, for example, aluminum.

The protective overcoat 45 deposited on the electric insulator layer 42 so as to cover the strain sensor 40 is made of any one of a synthetic resin such as, for example, solder-resist, buryl rubber and silicon rubber, or a combination of them.

In summary, while the strain inducing unit 1 is substantially made of metal, the strain detecting unit 43 of the strain sensor 40 shown in FIG. 3 is formed on the metal substrate 41 which is in turn mounted in the strain inducing unit 1 by the use of the welding technique in the manner as described hereinbefore. The welding job employed to secure the strain sensor 40 to the first and second intermediate plate members 30A and 30B involves an easy mechanical handling and does not require any large-sized workshop such as an vacuum chamber. Accordingly, as compared with the prior art structure in which either a bonding agent or a patterning technique is employed, the mounting of the strain sensor 40 to the strain inducing unit 1 can readily and efficiently be accomplished with high workability, thereby facilitating a production of the load cells.

Also, in the strain inducing unit 1 of the above described construction, the upper and lower plate structures 12 and 22 have the strain inducing areas 6 between the top walls 10a and 4a in the upper plate structure 12 and between the bottom walls 20a and 4a in the lower plate structure 22, so that the movable rigid body 3 can move downwardly and generally parallel relative to the fixed rigid body 2 according to the load imposed thereon. In addition, the strain inducing unit 1 of the above described construction is of a symmetrical structure. Therefore, the strain inducing unit 1 as a whole constitute the Roberval's parallel motion mechanism. With this Roberval's parallel motion mechanism, the strain induced in the strain detecting unit 43 positioned in a region bound by the strain inducing areas 6 is in proportion to the load to be measured and, therefore, a precise and accurate detection of the load can advantageously be accomplished with minimized adverse effect of a moment of the load.

Also, the metal substrate 41 forming a part of the strain sensor 40 is held in contact with the first and second intermediate plate members 30A and 30B merely through the opposite end portions 40c thereof that are welded to the associated mounts 30a of the first and second intermediate members 30A and 30B, and a major portion of said metal substrate 41 being held out of contact from any one of the first and second intermediate plate members 30A and 30B. Therefore, the metal substrate 41 is substantially insensitive to any possible load-induced deformation which would otherwise occur when a large surface area of the metal substrate 41 opposite to the strain sensor 40 is brought into frictional contact with any one of the intermediate plate members, thereby making it possible to accomplish a precise and accurate detection of the load.

Considering that the metal substrate 41 on which the strain detecting unit 43 is formed through the electric insulator layer 42 is made of the same metallic material, that is, stainless steel, as that for the strain inducing unit 1, the metallic substrate 41 exhibits the same coefficient of thermal expansion as that exhibited by the strain inducing unit 1 and, therefore, any possible change in amount of strain detected by the strain detecting unit 43 with a change in ambient temperature can be minimized or substantially eliminated, with the strain sensor 40 consequently exhibiting a favorable temperature dependent characteristic.

Moreover, since the metal substrate forming a part of the strain sensor 40 is in the form of the thin metallic plate having the constricted areas 41b which generate the strain as a result of the stress build-up and the strain detecting unit 43 is positioned at that constricted area 41b, a substantially increased amount of strain acts on the strain detecting unit 43, making it possible to accomplish the precise and accurate detection of the load. Yet, since the metallic plate 41 has a sufficiently small thickness and also has a cross-sectional surface area S shown in FIG. 5 which is of a size small enough to avoid the possibility that the amount of strain induced in the strain inducing unit 1 will be adversely affected, the accuracy of the load detection will not be reduced.

Furthermore, since the metal substrate 41 has its opposite end portions welded to the first and second intermediate plate members 30A and 30B with the region of the strain detecting unit 43 positioned clear from and intermediate between the first and second plate members 30A and 30B, the strain detecting unit 43 will not be adversely affected by and undesirably deformed by the elevated temperature during the welding job.

The use of the protective overcoat 45 covering the strain detecting unit 43 is effective to avoid any possible reduction in detecting capability of the strain detecting unit 43 which would occur when adversely affected by humidity, thereby ensuring a stable functioning of the strain detecting unit 43 for a prolonged time.

Yet, since the spot-welding technique is employed to secure the metal substrate 41 to the first and second intermediate plate members 30A and 30B, the entire surface area occupied by spot-weld joints between the metal substrate 41 and the first and second intermediate plate members 30A and 30B is much smaller than that which would be occupied when a seam welding is effected. Where the seam welding technique occupying a large welding area is employed to weld the metal substrate 41 to the first and second intermediate plate members 30A and 30B, there is a possibility that a deviation occurring between the metal substrate 41 and any one of the first and second intermediate plate members 30A and 30B when the strain inducing unit 1 undergoes a deformation will not be sufficiently absorbed and a frictional contact between the metal substrate 41 and any one of the first and second plate members 30A and 30B would hamper a deformation of the strain inducing unit 1 according to the load imposed thereon. The use of the spot-welding technique occupying a small welding area for welding the metal substrate to the first and second plate members 30A and 30B is effective to avoid such a possibility, making it possible to secure the precise and accurate load detection. It is to be noted that the employment of the YAG welding technique is effective to avoid a stress set-up around each spot-weld joint and, therefore, will not adversely affect the linearity of the strain inducing unit 1.

Also, since welding area of the spot welding is small as compared with the seam welding, internal stresses which would occur in the metal substrate 41 is suppressed thereby minimizing an adverse effect of the internal stresses on the deformation of the strain inducing unit 1.

In the construction shown in and described with reference to FIGS. 1 to 5, all of the upper plate structure 12, the lower plate structure 22 and the first and second intermediate plate members 30A and 30B are made of metal by the use of a press work thereby to constitute the strain inducing unit 1. Therefore, as compared with the prior art, the present invention does not require the use of any die casting and a subsequent machining both employed in the practice of the prior art to form the strain inducing unit, and accordingly, the present invention is effective to simplify the process of making the strain inducing unit thereby to improve the productivity.

Moreover, since the strain inducing unit 1 as a whole has a symmetrical profile, or symmetric with respect to the center point C thereof, both of the upper plate structure 12 and the lower plate structure 22, which form the respective upper and lower portions of the fixed and movable rigid bodies 2 and 3, can be manufactured by the use of a single and the same die and punch and, therefore, the present invention is effective to enhance the production of the strain inducing unit 1 and, hence, the load cell using the same, accompanied by a reduction in the manufacturing cost of the load cell.

Figure 6:
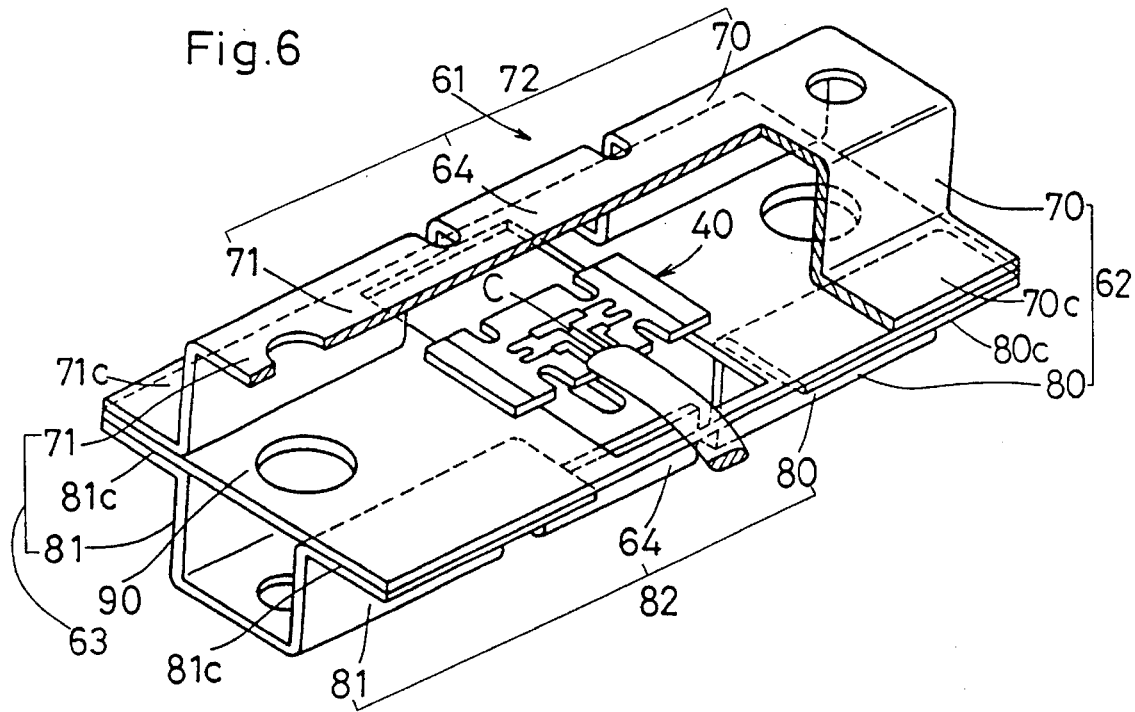
FIG. 6 is a schematic perspective view of the load cell according to a second preferred embodiment of the present invention.

FIG. 6 illustrates the strain inducing unit according to a second preferred embodiment of the present invention.

Referring first to FIG. 6, the strain inducing unit according to this embodiment is generally indicated by 61 has fixed and movable rigid bodies 62 and 63 occupying respective opposite ends of the strain inducing unit 61. This strain inducing unit 61 comprises generally elongated upper and lower plate structures 72 and 82 of substantially identical construction with the upper plate structure 72 positioned above the lower plate structure 82 so as to define a generally rectangular-sectioned hollow therebetween, a generally rectangular intermediate plate member 90 having its opposite end portions sandwiched at their side edges between the upper and lower plate structures 72 and 82, and a strain sensor 40 positioned within the rectangular-sectioned hollow and supported by the intermediate plate member 90 in a manner as will be described later.

The upper plate structure 62 is of one-piece construction including a pair of rigid body forming regions 70 and 71 opposite to each other and connected together by means of an upper beam 64, said rigid body forming regions 70 and 71 constituting respective upper portions of the fixed and movable rigid bodies 62 and 63. Similarly, the lower plate structure 82 is of one-piece construction including a pair of rigid body forming regions 80 and 81 opposite to each other and connected together by means of a lower beam 64, said rigid body forming regions 80 and 81 constituting respective lower portions of the fixed and movable rigid bodies 62 and 63, respectively. It is to be noted that the strain inducing unit 61 having the rectangular-sectioned hollow defined between the upper and lower plate structures 72 and 82 is symmetric in shape with respect to the center point C of the strain inducing unit 61.

Figure 7:
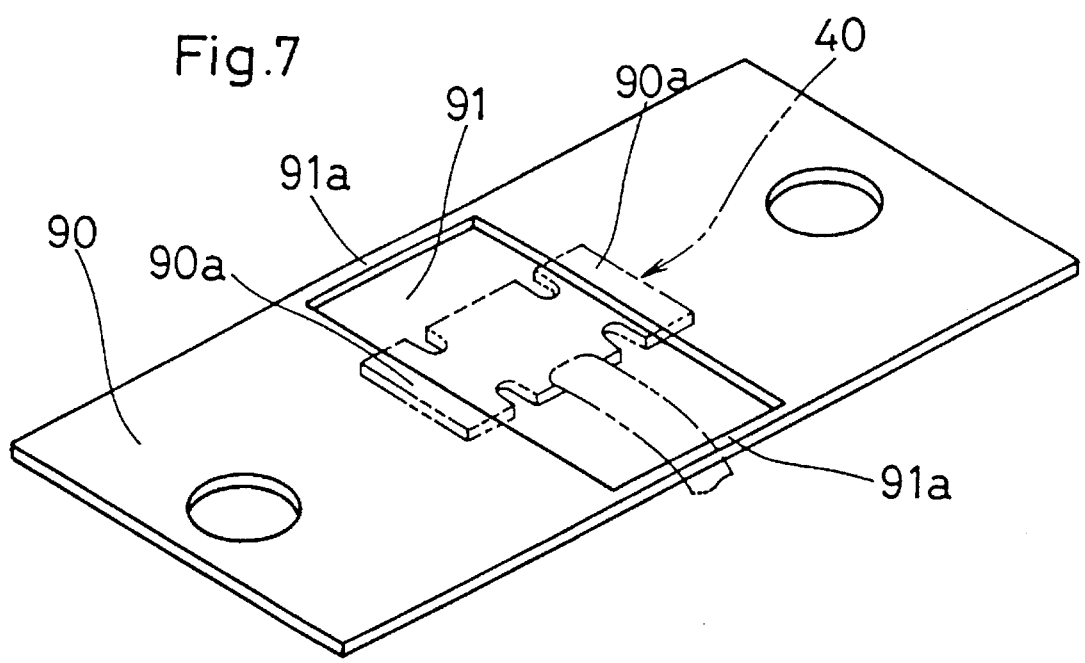
FIG. 7 is a schematic perspective view of an intermediate plate employed in the load cell shown in FIG. 6.

The structure so far described is substantially similar to that described in connection with the first preferred embodiment of the present invention except that, instead of the use of the two intermediate plate members 90 in the first embodiment, a single intermediate plate member 90 is employed. More specifically, as best shown in FIG. 7, the intermediate plate member 90 shown therein has an intermediate portion blanked off to define a generally rectangular opening 91 having its longitudinal axis oriented perpendicular to the longitudinal axis of the intermediate plate member 90 while leaving a pair of opposite connecting strips 91a. Opposite peripheral lip regions of the intermediate plate member 90 defining the opening 91, which lie parallel to the respective ends of the intermediate plate member 90, form respective mounts 90a to which the opposite ends of the strain sensor 40 of the structure described in connection with the previous embodiment of the present invention are welded to permit the strain sensor 40 to be supported by the intermediate plate member 90 while bridging over the opening 91.

To complete the strain inducing unit 61, the intermediate plate member 90 is sandwiched between the upper and lower plate structures 72 and 82 with flanges 70c and 71c of the upper plate structure 62 welded together with the associated flanges 80c and 81c of the lower plate structure 82. At this time, opposite side edge portions of the intermediate plate member 90 are sandwiched between the flanges 70c and 71c of the upper plate structure 72 and the flanges 80c and 81c of the lower plate structure 82 and are then welded thereto. For welding the upper and lower plate structures 72 and 82 together with the intermediate plate member 90 intervening therebetween, any suitable welding method may be employed such as, for example, a spot welding technique. Prior to the welding being effected to the flanges 70c, 71c and 80c, 81c of the upper and lower plate structures 72 and 82, the strain sensor 40 is secured at its opposite ends to the respective mounts 90a of the intermediate plate member 90 so as to traverse the opening 91 defined in the intermediate plate member 90.

In the construction shown in and described with reference to FIGS. 6 and 7, the upper plate structure 72. the lower plate structure 82 and the intermediate plate member 90, all made of metal by the use of a press work constitute the strain inducing unit 1 together with the strain sensor 40. Therefore, as is the case with the previously embodiment of the present invention, not only can the productivity of the load cell be increased, but also both of the upper plate structure 72 and the lower plate structure 82, which form the respective upper and lower portions of the fixer and movable rigid bodies 62 and 63, can be manufactured by the use of a single and the same die and punch, thereby enhancing the production of the strain inducing unit 61 and, hence, the load cell using the same, accompanied by a reduction in the manufacturing cost of the load cell.

Moreover, the strain inducing unit 61 as a whole has a symmetrical profile thereby to form the Roberval's parallel motion mechanism. Therefore, in the event that the movable rigid body 63 in the load cell is loaded, the strain in a quantity proportional to the load imposed on the movable rigid body 63 is induced in the strain sensor 40 supported by the intermediate plate member 90 so as to traverse the opening 91 defined therein, thereby to accomplish a precise and accurate detection of the load without being adversely affected by a moment of the load.

Specifically according to the second preferred embodiment of the present invention, the intermediate plate member 90 is formed by preparing a single metal plate and perforating an intermediate portion thereof to define the rectangular opening 91 for accommodating the strain sensor 40 that subsequently mounted therein with its opposite ends secured to the mounts 90a while bridging over the opening 90. Therefore, while in the construction according to the previous embodiment of the present invention cane is required to avoid any deviation in relative positions among the strain sensor 40, and the first and second intermediate plate members 30A and 30B, the second preferred embodiment of the present invention does not require such a precise positioning. Since the intermediate plate member 90 is in the form of the single metal plate having the opening 91 defined therein, the second preferred embodiment of the present invention suffices to mount the strain sensor 40 in position and, therefore, the strain sensor 40 can easily be positioned relative to the single intermediate plate member 90, accompanied by an increased ease to assembly the strain inducing element 61 with an improved productivity.

According to the previously discussed first preferred embodiment of the present invention, if the strain sensor 40 is mounted on the first and second intermediate plate members 30A and 30B improperly, that is, in a deviated fashion, and the resultant assembly is subsequently positioned between the upper and lower plate structures 12 and 22 to complete the strain inducing element 61, and considering that the position where the first and second plate members 30A and 30B are mounted is in practice restricted by the upper and lower plate structures 12 and 22, an unnecessary initial load resulting from the deviation in position of the strain sensor 40 relative to one or both of the intermediate plate members 30A and 30B will act on the strain sensor 40. Once this occurs, the strain sensor 40 may be damaged or will give rise to an incorrect measurement accompanied by a reduction in load detecting accuracy. This possibility does not occur according to the second preferred embodiment of the present invention shown in and described with particular reference to FIGS. 6 and 7.

More specifically, in the practice of the second embodiment of the present invention, since the strain sensor 40 is mounted on the single intermediate plate member 90 so as to bridge over the opening 91 defined therein and the resultant assembly is subsequently mounted between the upper and lower plate structures 72 and 82, no unnecessary initial load act on the strain sensor 40, resulting not only in an increase in durability of the strain sensor 40 and, hence, that of the strain inducing unit 61, but also in an increased load detecting accuracy.

It is to be noted that, if in the practice of the second embodiment of the present invention the size of each of the connecting strips 91a connecting the opposite end portions of the plate member 90 is properly chosen, not only can the load imposed on the strain sensor 40 be controlled, but also a thermal conductivity of the strain sensor 40 and the strain inducing unit 61 as a whole can be controlled, thereby permitting the strain inducing unit 61 to exhibit a thermal stability against a change in temperature.

Figure 8:
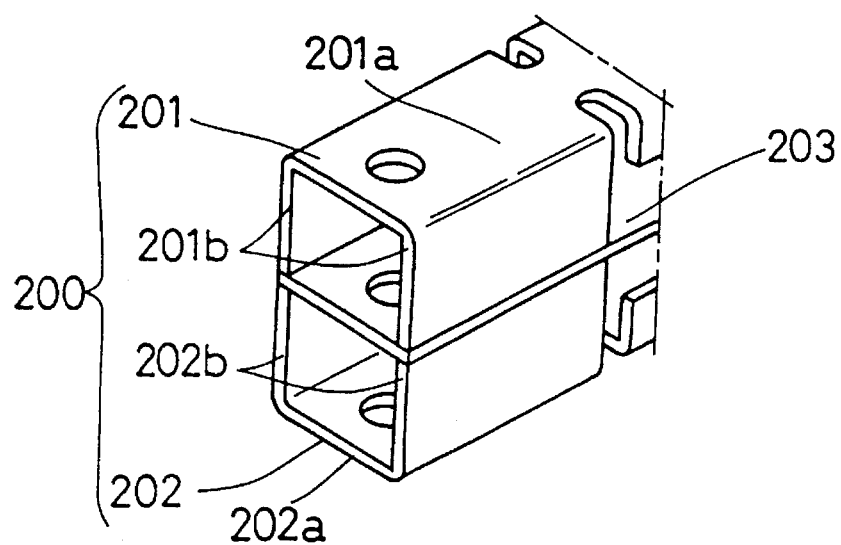
FIG. 8 is a fragmentary perspective view showing a modified form of one of fixed and movable rigid bodies forming respective parts of the load cell of the present invention.

In any one of the foregoing embodiments of the present invention, each of the upper and lower plate structures 12 and 22 or 71 and 81 has been shown and described as having flanges for connecting the upper and lower plate structures together with the associated plate member or members sandwiched therebetween. However, each end portion of each of the upper and lower plate structures and the associated intermediate plate member may be modified as shown in FIG. 8. In the modification of FIG. 8, no flanges, such as employed in any one of the first and second embodiments of the present invention is employed.

Referring now to FIG. 8 in which only one end portion of each of the upper ann lower plate structures 102 and 103 which forms the fixed or movable rigid bodies 200 is shown for the sake of brevity, an upper portion of each of the fixed rigid and movable bodies 200 and 203 is formed by a corresponding upper rigid body forming region 201 having a top wall 201a and a pair of opposite side walls 201b substantially perpendicular to the top wall 201a and, similarly, a lower portion of each of the fixed rigid and movable bodies 200 is formed by a corresponding lower rigid body forming region 202 having a bottom wall 202a and a pair of opposite side walls 202b substantially perpendicular to the bottom wall 202a. An intermediate plate 203 has a width corresponding to the span between the side walls 201b of each of the upper and lower rigid body forming regions 201 and 202, having its side edges sandwiched and welded in position between the side walls 201b and 202b.

According to the modification shown in and described with reference to FIG. 8, since no flange is employed in each of the upper and lower plate structures, it is evident that the strain inducing unit 101 has a light-weight feature.

Figure 9:
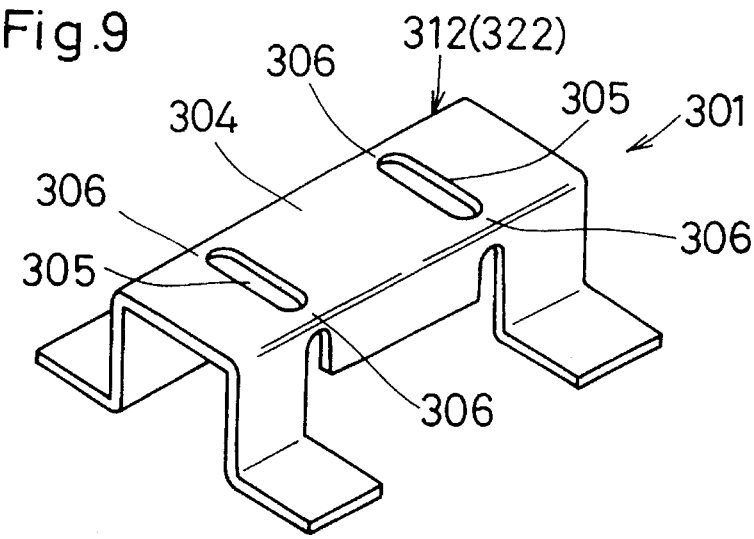
FIG. 9 is a fragmentary perspective view showing a modified form of one of beam members forming respective parts of the load cell of the present invention.

Also, in any one of the foregoing embodiments of the present invention, the pairs of the notches has been described as formed in each of the upper and lower plate structures to define the two constricted regions of reduced width. However, in a further modification shown in FIG. 9, each of the upper and lower plate structures 312 and 322 of the strain inducing unit 301 (only the upper one 312 is shown in FIG. 9) has a beam portion 304 in which a pair of slots 305, each having a pair of rounded ends opposite to each other, are defined so as to extend perpendicular to the longitudinal axis of the plate structure, thereby leasing the pairs of the constricted regions 306, one pair on each side thereof.

Figure 10:
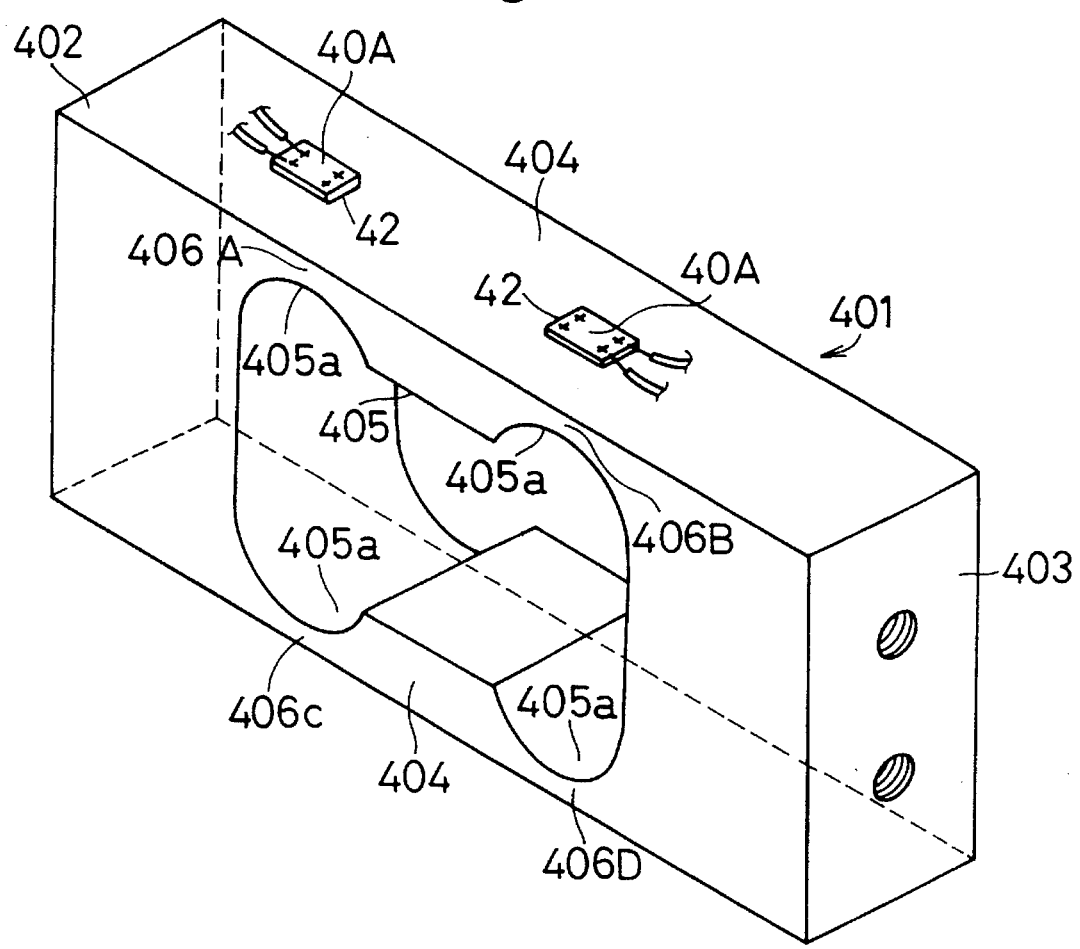
FIG. 10 is a schematic perspective view of the load cell according to a third preferred embodiment of the present invention.

FIG. 10 illustrates a third preferred embodiment of the present invention. The strain inducing unit shown therein is generally identified by 401. Strain sensors used in association with this strain inducing unit 401 to form the load cell is generally identified by 40A in FIG. 11.

Figure 11:
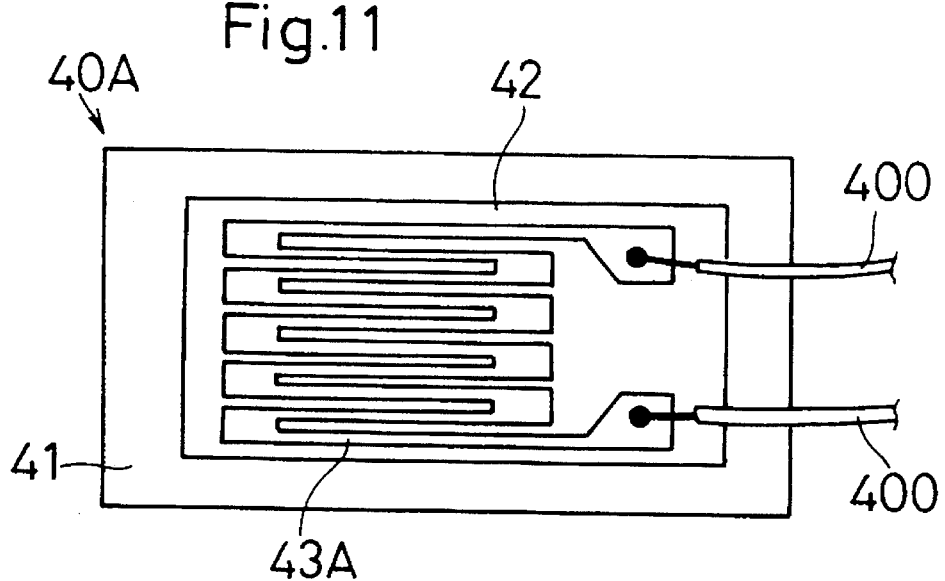
FIG. 11 is a top plan view of the strain sensor employed in the load cell shown in FIG. 10.
Figure 12:
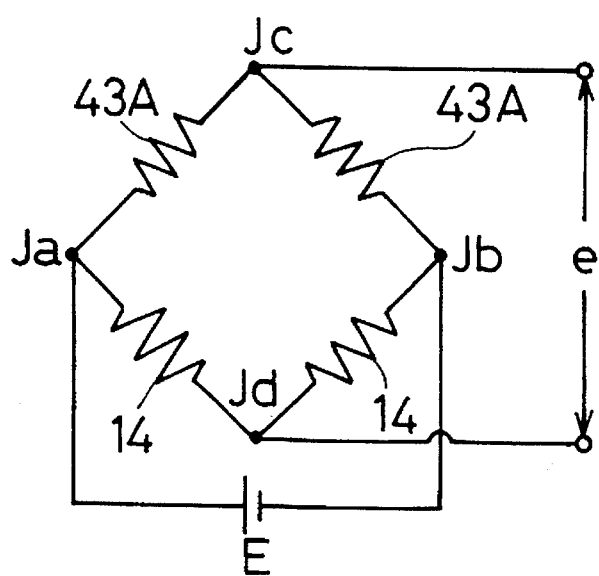
FIG. 12 is a circuit diagram showing a load detecting circuit in which the load sensor shown in FIG. 10 is employed.

Referring first to FIG. 11, each of the strain sensors 40A includes a generally rectangular metal substrate 41 made of, for example, stainless steel, an insulating layer 42 formed on one surface of the metal substrate 41, and a strain detecting resistance element 43A made of, for example, tantalum nitride, deposited in a predetermined pattern on a surface of the insulating layer 42 opposite to the metal substrate 41. Opposite ends of the patterned resistance element 43A are connected with respective lead wires 400 which are in turn connected in the Wheatstone bridge network as shown in FIG. 12. The formation of the strain detecting resistance element 43A on the metal substrate 41 through the insulating layer 42 may be carried out in a known manner by the utilization of a thin-film technology and a lithographic technique.

Referring now to FIG. 10, the strain inducing unit 401 is made of metal such as, for example, stainless steel or duralumin into a generally rectangular cubic body having a cave 405 defined herein. Specifically, the rectangular cubic body of metal, which eventually forms the strain inducing unit 401, has a generally intermediate portion formed with the cave 405 which is so designed and so shaped as to leave fixed and movable rigid bodies 402 and 403 at opposite ends thereof, respectively, and also as to leave top and bottom beam portions 404 at opposite sides thereof, respectively, said top and bottom beam portions 404 connecting the fixed and movable rigid bodies 402 and 403 together.

The strain inducing unit 401 according to the third embodiment of the present invention is, if it is desired to be used as the load cell for, for example, the electronic scale, used in practice with the fixed and movable rigid bodies 402 and 403 rigidly secured to the scale base and the scale table, both forming respective parts of the electronic scale, in a manner similar to that shown in and described with reference to FIG. 5 and also to FIG. 17.

Opposite portions of the cave 405 adjacent the fixed and movable rigid bodies 402 and 403 are enlarged in shape to represent a generally oval shape so that opposite ends of each of the beam portions 404, which connect the respective beam portion 404 with the fixed and movable rigid bodies 402 and 403, respectively, are reduced in thickness so as to define associated thin-walled, strain generating area 406A and 406B or 406C and 406D, thereby to allow the strain inducing unit 401 to represent the Roberval's parallel motion mechanism in which, when a load is imposed on the movable rigid body 403, the latter undergoes a parallel downward motion relative to the fixed rigid body 402.

Accordingly, when the movable rigid body 403 undergoes the parallel downward motion relative to the fixed rigid body 402, a tension acts on a surface of the strain generating area 406A between the top beam portion 404 and the fixed rigid body 402 and also on the strain generating area 406D between the bottom beam portion 404 and the movable rigid body 403 whereas a compression acts on the strain generating area 406B between the top beam portion 404 and the movable rigid body 403 and also on the strain generating area 406C between the bottom beam portion 404 and the fixed rigid body 402.

The strain sensors 40A are rigidly mounted on the upper side face of the strain inducing unit 401 at respective locations adjacent the strain generating areas 406A and 406B by the use of a spot-welding technique utilizing a laser beam or an electron beam applied to the respective metal substrates 41 of the associated strain sensors 40A to connect them to the strain inducing unit 401. Therefore, it is clear that the strains induced by the movable rigid body 403 then undergoing the parallel downward motion relative to the fixed rigid body 402 can be detected by the strain detecting resistance elements 43A as a function of a change in resistance of each of the resistance elements 43A.

As is the case with the example shown in and described with reference to FIG. 4, the resistance elements 43A are connected together with dummy resistors 14 to form a well-known Wheatstone bridge network as shown in FIG. 12. In this Wheatstone bridge network shown in FIG. 12, a predetermined voltage E is applied between a junction Ja of one of the strain resistance elements 45A with one of the dummy resistors 14 and a junction Jb of the other of the resistance elements 43A with the other of the dummy resistors 14, an output voltage e, that is, an electric output signal as a function of the load imposed whereon, can be generated between the junctions Jc and Jd in correspondence with a change in resistance of each of the resistance elements 43A. This electric output signal is eventually processed to provide a measurement of the load imposed on the strain inducing unit 401.

Figure 13:
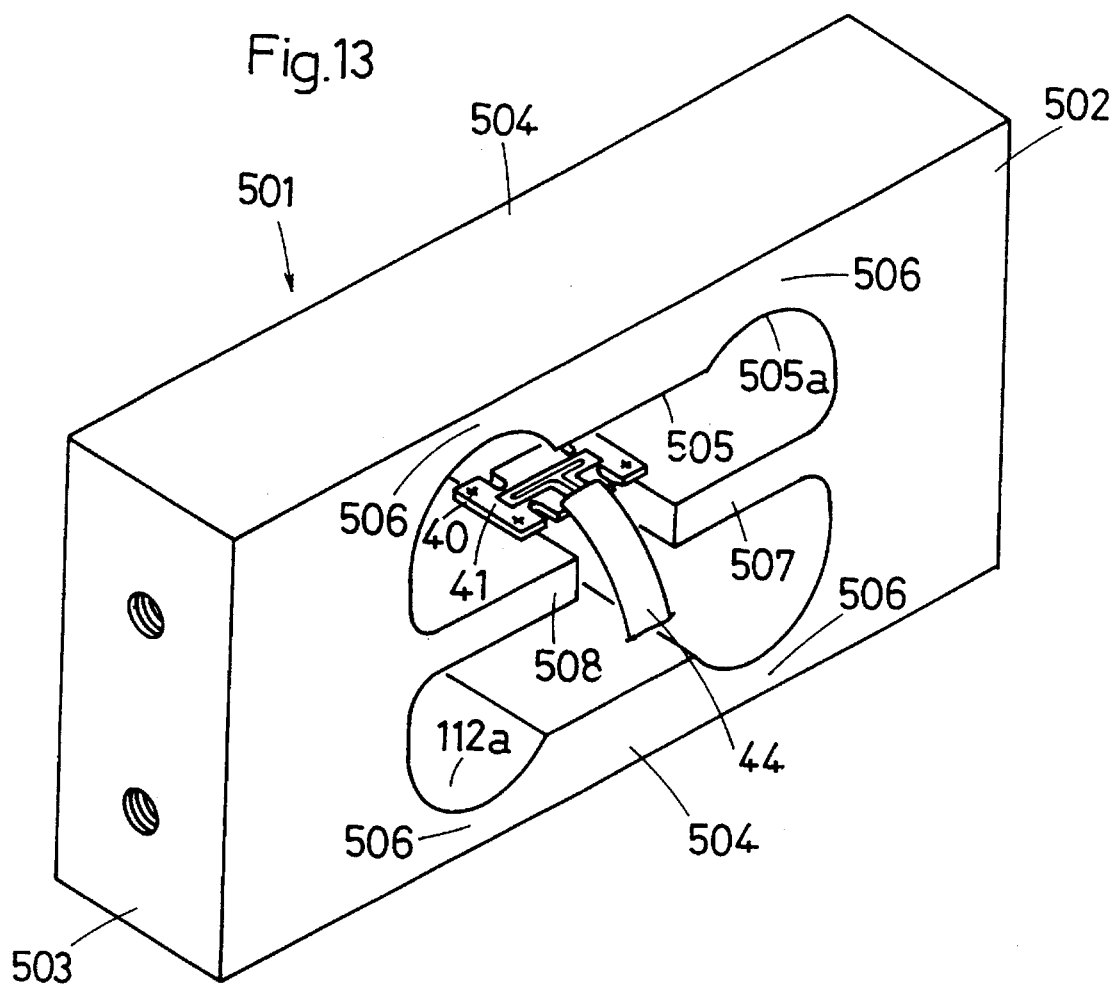
Figure 19:
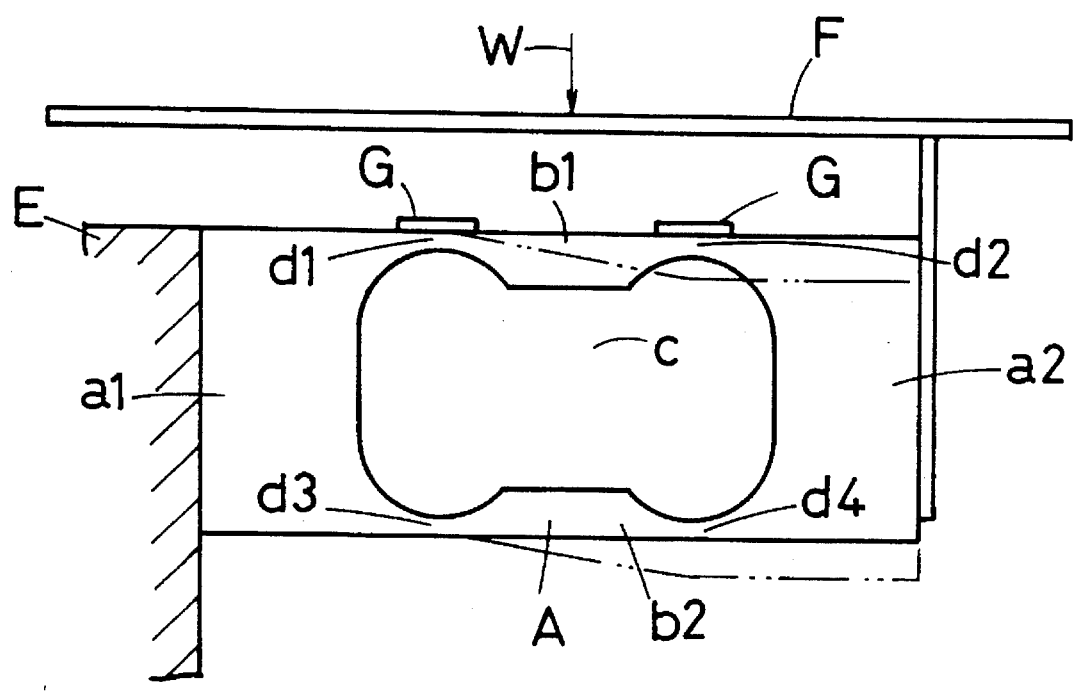
FIG. 19 is a schematic diagram showing the prior art load cell.

FIG. 13 illustrates a strain inducing unit 501 according to a fourth preferred embodiment of the present invention. This strain inducing unit 501 employs the strain sensor 40 of the construction shown in FIG. 3 to complete the load cell. More specifically, the strain inducing unit 501 is formed of metal into a generally rectangular cubic body having a cave 505 defined therein so as to leave fixed and movable rigid bodies 502 and 503 at opposite ends thereof, respectively, and also as to leave top and bottom beam portions 504 at opposite sides thereof, respectively, said top and bottom beam portions 504 connecting the fixed and movable rigid bodies 502 and 503 together. At the same time, opposite portions of the cave 505 adjacent the fixed and movable rigid bodies 502 and 503 are enlarged in shape to represent a generally oval shape so that opposite ends of each of the beam portions 504, which connect the respective beam portion 504 with the fixed and movable rigid bodies 502 and 503, respectively, are reduced in thickness so as to define associated thin-walled, strain generating area generally identified by 506, thereby to allow the strain inducing unit 501 to represent the Roberval's parallel motion mechanism.

To support the strain sensor 40, the strain inducing unit 501 has a pair of plate-like wings 507 and 508 integral therewith. The plate-like wings 507 and 508 protrude inwardly of the cave 505 in alignment with the longitudinal axis of the strain inducing unit 501 in respective directions close towards each other so as to leave a mounting space between respective free ends of the plate-like wings 507 and 508. As is the case with any one of the first and second embodiments of the present invention, the strain sensor 40 is mounted in position within the mounting space between the plate-like wings 507 and 508 with the opposite ends of the metal substrate 41 welded to the free ends of the plate-like wings 507 and 508, respectively.

FIGS. 14 to 16 illustrate respective modified forms of the strain inducing unit to which the strain sensor 40 shown in FIG. 3 can be suitably mounted. The strain inducing unit 601 shown in FIG. 14 is of a construction wherein a pair of intermediate plates 630, spaced apart from each other, are positioned between upper and lower beam plates 604 each having a pair of notches 605 defined on each side thereof and wherein the beam plates 604 and the intermediate plates 630 are connected together by means of a pair of connecting blocks 607 occupying respective positions corresponding to fixed and movable rigid bodies 602 and 603. Each of the intermediate plates 630 is of a double-walled structures including two plate members so that the opposite ends of the metal substrate 41 forming the strain sensor 40 can be spot-welded while sandwiched between the plate members, respectively. The paired notches 605 in each of the upper and lower beam plates 604 define a respective constricted or strain inducing area 606 therebetween.

In the modification shown in FIG. 15, the strain inducing unit shown by 701 includes fixed and movable rigid bodies 702 and 703 and upper and lower beam portions 704 and has a cave 705 defined between the upper and lower beam portions 704 and continued to recesses 705a employed for defining a strain generating area 706. Plate-like mounting wings 707 and 708 are integrally formed therewith so as to lie above the upper beam portion 704 with their free ends spaced a distance from each other. The free ends of the plate-like mounting wings 707 and 708 are partly recessed inwardly to form respective recesses 709 complemental in shape to the shape of the associated end of the strain sensor 40. The strain sensor 40 is accommodated in the mounting space defined between the plate-like mounting wings 707 and 708 with the opposite ends of the strain sensors 40 spot-welded to the respective plate-like mounting wings 707 and 708 while received in the respective recesses 709.

According to the modification shown in FIG. 15, the provision of the recesses 709 in the free ends of the plate-like mounting wings 707 and 708 advantageously makes it easy to accurately position the strain sensor 40 relative to the strain inducing unit 701.

Referring now to FIG. 16 showing a further modification of the strain inducing unit identified by 801. The strain inducing unit 80i shown therein is made of metal plates and is of a generally rectangular box-like configuration including top and bottom plates and a pair of end plates connecting the top and bottom plates together so as to represent a generally rectangular shape. Opposite end portions of the illustrated box-like strain inducing unit 801 form fixed and movable rigid bodies 802 and 803, respectively, which are connected by upper and lower beams 804 that are constituted by the top and bottom plates. Each of the upper and lower beams 804 has a generally H-shaped opening 805 defined therein so as to leave a pair of mounting wings 807 and 808 extending in a direction close towards each other and also parallel to the longitudinal axis of the strain inducing unit 801.

Each of the generally H-shaped openings 805 is delimited by a pair of longitudinal slots 805a extending parallel to each other and also lengthwise of the associated upper or lower beam 804, a mounting space 810 communicating between respective intermediate portions of the longitudinal slots 805a and delimited by the free ends of the mounting wings 807 and 808, a pair of transverse slats 805b extending from opposite ends of each of the longitudinal slots 805a in a direction perpendicular to the longitudinal axis of the strain inducing unit 801 and away from the other of the longitudinal slots. Paired constricted, strain generating areas 806 are defined by the transverse slots 805b that are aligned with each other.

The strain sensor 40 is accommodated in the mounting space 810 with its opposite ends spot-welded to the free ends of the mounting wings 707 and 708 while traversing therebetween.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. For example, although the strain sensor employed in any one of the foregoing embodiments of the present invention has been of the type having the metal substrate and the resistance elements formed on the metal substrate through the insulating layer by the use of the patterning technique, it may comprise a metal substrate having generally interdigital transducers deposited on a thin-film layer having a piezoelectric property. Where this alternative strain sensor is employed, the resonance frequency of surface acoustic waves propagating in portions of the piezoelectric thin-film layers among the interdigital transducers varies as a function of the amount of strain induced in the metal substrate and, therefore, the detection of a change in resonance frequency in time axis effectively provides an indication of the amount of the strain actually induced in the strain inducing unit.

Also, while in FIG. 10 the strain sensor or sensors have been shown and described as mounted on the upper beam portion with the resistance elements thereof employed to form the Wheatstone bridge network together with the associated dummy resistors, additional one or two strain sensors 40A, as shown in FIG. 17 or FIG. 18, identical in construction with that shown in FIG. 11 and described may also be mounted on the strain generating area 66 or 608 of the lower beam 64 or 604 with the resistance elements thereof forming the Wheatstone bridge network.

It is to be noted that, in FIG. 17, the strain inducing element 61A has an opening 67 on respective sides thereof, and an edge portion 67a of said opening confronting in a lengthwise direction thereof constitutes a strain generating area 66.

Moreover, the strain inducing unit may not be always so structured and so configured to represent the Roberval's parallel motion mechanism.

Accordingly, such changes and modifications are, unless they depart from the spirit and scope of the present invention as delivered from the claims annexed hereto, to be construed as included therein.

What is claimed is:

1. A load cell for use in detecting a load imposed thereon, said load cell comprising:

a strain inducing means made of metal for generating a strain as a function of the load;

a strain sensor including a metal substrate having a strain detecting element formed thereon for detecting the strain generated in the strain inducing means, said metal substrate being of a generally rectangular shape having a pair of first sides opposite and parallel to each other and a pair of second sides opposite to each other, said metal substrate having a pair of strain generating areas defined therein and situated between said first sides while separated a distance from each other in a direction parallel to any one of the first sides, each of said strain generating areas being where stress build-up occurs;

said detecting element being positioned at each of said strain generating areas for detecting the strain generated at the respective strain generating area and away from each of the second sides of the metal substrate;

said strain sensor being mounted in the strain inducing means with the second sides of the metal substrate, spot-welded to said strain sensor, being oriented along a horizontal plane when in an unloaded mode and said second sides being positioned on horizontal mount surfaces of mount portions of the strain inducing means; and said metal substrate being a thin plate having a smaller cross-sectional area perpendicular to said first sides, than said mount portions.

2. The load cell as claimed in claim 1, wherein said strain sensor is made of a metal plate, each of said strain generating areas having at least one notch formed therein so that stress build-up occurs.

3. The load cell as claimed in claim 1, wherein said strain inducing means, comprises a fixed rigid body adapted to be secured to a base, a movable rigid body adapted to receive the load, said fixed and movable rigid bodies occupying respective positions corresponding to opposite end portions of the load cell, and a pair of beam members extending parallel to each other and connecting the fixed and movable rigid bodies together so that, when the load acts on the movable rigid body, the movable rigid body undergoes a parallel downward motion relative to the fixed rigid body, and wherein the strain generating region is defined on each of the beam members.

4. The load cell as claimed in claim 1, wherein said strain inducing means comprises generally elongated first and second structures with the first structure positioned above the second structure so as to define a generally hollow therebetween, an intermediate plate means sandwiched between the first and second structures, said strain sensor being positioned within the hollow and welded to the intermediate plate means, and wherein said first structure is of one-piece construction including a pair of upper rigid body forming regions opposite to each other and connected together by means of an upper beam, said upper rigid body forming regions constituting respective upper portions of the fixed rigid body adapted to be secured to a base and a movable rigid body adapted to receive the load and wherein the second structure is of one-piece construction including a pair of lower rigid body forming regions and opposite to each other and connected together by means of a lower beam, said lower rigid body forming regions constituting respective lower portions of the fixed and movable rigid bodies.

5. The load cell as claimed in claim 4, wherein each of the first and second structures is formed by the use of a metal plate and wherein said strain inducing means is of a symmetric structure.

6. A load cell for use in detecting a load imposed thereon, said load cell comprising:

a strain inducing means made of metal and operable to generate a strain as a function of the load, said strain inducing means comprising generally elongated first and second structures with the first structure positioned above the second structure so as to define a generally hollow therebetween, an intermediate plate means sandwiched between the first and second structures;

a strain sensor including a metal substrate having a strain detecting element formed thereon for detecting the strain generated in the strain inducing means, said strain sensor being positioned within the hollow and mounted in the strain inducing means with said metal substrate welded thereto;

wherein said first structure is of one-piece construction including a pair of upper rigid body forming regions opposite to each other and connected together by means of an upper beam, said upper rigid body forming regions constituting respective upper portions of the fixed rigid body adapted to be secured to a base and a movable rigid body adapted to receive the load and wherein the second structure is of one-piece construction including a pair of lower rigid body forming regions and opposite to each other and connected together by means of a lower beam, said lower rigid body forming regions constituting respective lower portions of the fixed and movable rigid bodies; and, wherein said intermediate plate means includes a first intermediate plate member sandwiched between first rigid body forming regions of the first and second the upper and lower portions of the fixed rigid body, and a second intermediate plate member sandwiched between the upper and lower portions of the movable rigid body, said first and second intermediate plate members having respective ends confronting with each other, said metal substrate of said strain sensor being welded at its opposite ends to said ends of the first and second intermediate plate members.

7. A load cell for use in detecting a load imposed therein, said load cell comprising:

a strain inducing means made of metal and operable to generate a strain as a function of the load, said strain inducing means comprising generally elongated first and second structures with the first structure positioned above the second structure so as to define a generally hollow therebetween, an intermediate plate means sandwiched between the first and second structures;

a strain sensor including a metal substrate having a strain detecting element formed thereon for detecting the strain generated in the strain inducing means, said strain sensor being positioned within the hollow and mounted in the strain inducing means with said metal substrate welded thereto;

wherein said first structure is of one-piece construction including a pair of upper rigid body forming regions opposite to each other and connected together by means of an upper beam, said upper rigid body forming regions constituting respective upper portions of the fixed rigid body adapted to be secured to a base and a movable rigid body adapted to receive the load and wherein the second structure is of one-piece construction including a pair of lower rigid body forming regions and opposite to each other and connected together by means of a lower beam, said rigid body forming regions constituting respective lower portions of the fixed and movable rigid bodies; and, wherein said intermediate plate means comprises a single plate member having an opening defined at an intermediate portion thereof, opposite peripheral lip regions of said opening defining respective mounts to which the opposite ends of the strain sensor are welded while traversing across the opening.

8. The load cell as claimed in claim 1, wherein said strain inducing meats and said metal substrate are made of identical metallic material.

9. The load cell as claimed in claim 1, wherein said metal substrate has a cross-sectional surface area small enough to prevent the amount of strain induced in the strain inducing means from being varied.

10. The load cell as claimed in claim 1, wherein said strain sensor is protected by an electrically insulating overcoat.

11. The load cell as claimed in claim 1, wherein an electrically insulating layer is formed on one surface of the metal substrate and the strain detecting element is formed on the electrically insulating layer.

12. The load cell as claimed in claim 1, wherein said metal substrate is welded to the strain inducing means by means of a YAG welding technique.

13. A method of manufacturing a load cell including a strain inducing means made of metal and operable to generate a strain as a function of a load imposed on the strain inducing means, and a strain sensor having a strain detecting element formed on a metal substrate and mounted on said strain inducing means, said metal substrate being of a generally rectangular configuration having a pair of first sides opposite and parallel to each other and a pair of second sides opposite to each other and lying perpendicular to any one of said first sides, said method comprising the steps of:

forming first and second strain generating areas in said metal substrate at a location between said first sides while separated a distance from each other in a direction parallel to any one of the first sides, each of said strain generating areas being where stress build-up occurs;

mounting the strain detecting element on each of the strain generating areas of the metal substrate so that the strain generated at the respective strain generating area may be detected by the strain detecting element, thereby completing a strain sensor; and mounting the strain sensor in the strain inducing means with the second sides of the metal substrate spot-welded to horizontal mount surfaces of mount portions of said strain inducing means such that said strain sensor is in a horizontal plane when in an unloaded state, wherein said metal substrate is formed as a thin plate having a smaller cross-sectional area perpendicular to said first sides than said mount portion.

14. The method of manufacturing the load cell as claimed in claim 13, wherein said forming step comprises a step of forming a plurality of detecting elements on a metallic matrix and a step of cutting the metallic matrix into a corresponding number of sensor elements, each of said sensor elements constituting the strain sensor.

15. A weighing apparatus utilizing a load cell of a structure defined in claim 1, and having a scale table, said load cell being operably coupled with said scale table to detect a load placed on the scale table.

16. A weighing apparatus utilizing a plurality of load cells, each being of a structure defined in claim 1, and having a scale table, each of said load cells being operably coupled with said scale table to detect a load placed on the scale table.

17. A method of weighing an object to be weighed, which is operatively coupled with a load cell of a structure defined in claim 1, said method comprising a step of detecting the strain induced in the strain inducing means.

18. The method of weighing the object as claimed in claim 17, wherein the strain induced in the strain inducing means is detected by designing said metal substrate so as to have a cross-sectional surface area small enough to prevent the amount of strain induced in the strain inducing means from being varied.

19. The load cell of claim 1, wherein said strain inducing means includes a pair of mounts to which said metal substrate is welded, said mounts confronting each other with any one of a gap and an opening intervening therebetween, said any one of the gap and the opening being bridged by said metal substrate.

20. The weighing method as claimed in claim 13, wherein said strain inducing means includes a pair of mounts to which said metal substrate is welded, said mounts confronting each other with any one of a gap and an opening intervening therebetween, said any one of the gap and the opening being bridged by said metal substrate.

21. The weighing apparatus as claimed in claim 15, wherein said strain inducing means includes a pair of mounts to which said metal substrate is welded, said mounts confronting each other with any one of a gap and an opening intervening therebetween, said any one of the gap and the opening being bridged by said metal substrate.

22. The weighing apparatus as claimed in claim 16, wherein said strain inducing means includes a pair of mounts to which said metal substrate is welded, said mounts confronting each other with any one of a gap and an opening intervening therebetween, said any one of the gap and the opening being bridged by said metal substrate.

23. The weighing method as claimed in claim 17, wherein said strain inducing means includes a pair of mounts to which said metal substrate is welded, said mounts confronting each other with any one of a gap and an opening intervening therebetween, said any one of the gap and the opening being bridged by said metal substrate.

24. A weighing apparatus which comprises:

a load cell of a structure defined in claim 6, and a weighing table adapted to support thereon a load to be weighed, said weighing table being operatively coupled with said load cell for weighing the load on the weighing table.

25. A weighing apparatus which comprises:

a load cell of a structure defined in claim 7, and a weighing table adapted to support thereon a load to be weighed, said weighing table being operatively coupled with said load cell for weighing the load on the weighing table.

26. A weighing apparatus which comprises:

a plurality of load cells each being of a structure defined in claim 6, and a weighing table adapted to support thereon a load to be weighed, said weighing table being operatively coupled with said load cells for weighing the load on the weighing table.

27. A weighing apparatus which comprises:

a plurality of load cells each being of a structure defined in claim 7, and a weighing table adapted to support thereon a load to be weighed, said weighing table being operatively coupled with said load cells for weighing the load on the weighing table.

28. A load cell for use in detecting a load imposed thereon, said load cell comprising:

a strain inducing means made of metal and operable to generate a strain as a function of the load;

a strain sensor including a metal substrate having a strain detecting element formed thereon for detecting the strain generated in the strain inducing means, said metal substrate being of a generally rectangular shape having a pair of first sides opposite and parallel to each other and a pair of second sides opposite to each other, said metal substrate having a pair of strain generating areas defined therein and situated between said first sides while separated a distance from each other in a direction parallel to any one of the first sides, each of said strain generating areas being where stress build-up occurs;

said detecting element being positioned at each of said strain generating areas for detecting the strain generated at the respective strain generating area and away from each of said second sides of the metal substrate;

said strain sensor being mounted in the strain inducing means with the second sides of the metal substrate welded thereto without allowing the strain generating areas to contact a surface of the strain inducing means;

said strain sensor being oriented along a horizontal plane when in an unloaded mode and said second sides being positioned on horizontal mount surfaces of mount portions of the strain inducing means; and said metal substrate being a thin plate having a smaller cross-sectional area perpendicular to said first sides, than said mount portions.

29. The load cell as claimed in claim 28, wherein said strain inducing means has one of a gap and an opening defined therein, and said strain generating area are situated within said gap or opening.

30. A weighing apparatus which comprises:

a load cell of a structure defined in claim 28, and a weighing table adapted to support thereon a load to be weighed, said weighing table being operatively coupled with said load cell for weighing the load on the weighing table.

31. A weighing apparatus which comprises:

a plurality of load cells each being of a structure defined in claim 28, and a weighing table adapted to support thereon a load to be weighed, said weighing table being operatively coupled with said load cells for weighing the load on the weighing table.

* * * * *